United States Patent [19]

Steensgaard

[11] Patent Number: 6,072,950
[45] Date of Patent: Jun. 6, 2000

[54] POINTER ANALYSIS BY TYPE INFERENCE COMBINED WITH A NON-POINTER ANALYSIS

[75] Inventor: Bjarne Steensgaard, North Bend, Wash.

[73] Assignee: Microsoft Corporation, Redmond, Wash.

[21] Appl. No.: 08/664,441

[22] Filed: Jun. 18, 1996

[51] Int. Cl.$^7$ ...................................................... G06F 9/44
[52] U.S. Cl. ........................................... 395/708; 395/705
[58] Field of Search ..................................... 395/701–709

[56] References Cited

U.S. PATENT DOCUMENTS

| | | | |
|---|---|---|---|
| 5,361,351 | 11/1994 | Lenkov et al. ............................ | 395/704 |
| 5,488,727 | 1/1996 | Agrawal et al. ......................... | 395/709 |
| 5,689,665 | 11/1997 | Mitsui et al. . | |
| 5,748,966 | 5/1998 | Sato ....................................... | 395/708 |
| 5,790,866 | 8/1998 | Robison .................................. | 395/709 |

OTHER PUBLICATIONS

Aho, Alfred V., et al., Compilers: Principles, Techniques, and Tools, Addison–Wesley Publishing Company, pp. 11 and 22 (1986).

Aiken, Alexander, et al., "Static Type Inference in a Dynamically Typed Language," ACM, pp. 279–290 (1990).

Flannery, Kevin E., et al., "Conjunctive Polymorphic Type Checking On a Language of Combinators," Proceedings –1990 Southeastcon, Session 3D1, IEEE, pp. 183–187 (1990).

Giannini, Paola, et al., "Characterization of Typings in Polymorphic Type Discipline," IEEE, pp. 61–70 (1988).

Kfoury, A.J., et al., "On the Computational Power of Universally Polymorphic Recursion," IEEE, pp. 72–81 (1988).

Leroy, Xavier, "Unboxed Objects and Polymorphic Typing," ACM, pp. 177–188 (1992).

Pierce, Benjamin, et al., "Typing and Subtyping for Mobile Processes," Proceedings of the Eighth Annual Symposium on LICS, pp. 376–385 (1993).

Piperno, Adolfo, et al., "Type Inference and Extensionality," Proceedings of the Symposium on LICS, pp. 196–205 (1994).

Steensgaard, Bjarne, "Points–to Analysis in Almost Linear Time," Technical Report MSR–TR–95–08, Microsoft Research, Redmond, WA, pp. 1–12. Mar. 1995.

Steensgaard, Bjarne, "Points–to Analysis in Almost Linear Time," Proceedings of the 23rd SIGPLAN/SIGACT Symposium on Principles of Programming Languages, St. Petersburg, FL, pp. 32–41. Jan. 24, 1996.

Aho, Alfred V., et al., Compilers: Principles, Techniques, and Tools, Addison –Wesley Publishing Company, Contents and Chapter 6, pp. vii–x and 343–388 (1986).

Agesen, Ole, Concrete Type Inference: Delivering Object–Oriented Applications, Ph.D. Thesis, Stanford University, Abstract and Table of Contents, pp. i–ii, iv, and vi–viii (Dec. 1995).

Aiken, Alexander, et al., "Better Static Memory Management: Improving Region–Based Analysis of Higher–Order Languages," SIGPLAN '95 Conference on Programming Language Design and Implementation, La Jolla, California, pp. 174–185 (Jun. 1995).

Birkedal, Lars, et al., "From Region Inference to von Neumann Machines via Region Representation Inference," Proceedings of the 23rd SIGPLAN–SIGACT Symposium on Principles of Programming Language, St. Petersburg, Florida, pp. 171–183 (Jan. 1996).

Cousot, Patrick, et al., "Abstract Interpretation: A Unified Lattice Model for Static Analysis of Programs by Construction or Approximation of Fixpoints," Proceedings of the Fourth Annual ACM Symposium on Principles of Programming Languages, pp. 238–252 (Jan. 1977).

Damas, Luis et al., "Principal Type–Schemes for Functional Programs," Conference Record of the Ninth Annual ACM Symposium on Principles of Programming Languages, Albuquerque, New Mexico, pp. 207–212 (Jan. 1982).

Heintz, Nevin, Set Based Program Analysis, Ph.D. Thesis, Carnegie Mellon University, Abstract, Contents, and Chapter 1, pp. i–iv and 1–6 (1992).

Henglein, Fritz, "Type Inference with Polymorphic Recursion," ACM Transactions on Programming Languages and Systems, Vol. 15, No. 2, pp. 253–289 (Apr. 1993).

Mairson, Harry G., "Deciding ML Typability is Complete for Deterministic Exponential Time," Proceedings of the Seventeenth Annual ACM Symposium on Principles of Programming Languages, pp. 382–401 (Jan. 1990).

(List continued on next page.)

Primary Examiner—Tariq R. Hafiz
Assistant Examiner—Todd Ingberg
Attorney, Agent, or Firm—Schwegman, Lundberg, Woessner & Kluth, P.A.

[57] ABSTRACT

A pointer analysis by type inference combined with a non-pointer analysis helps approximate run-time store usage for a computer program. The analysis initially describes the content of each location for the program with a separate type as a non-pointer value. The analysis identifies store relationships described by the program and determines whether the location(s) and/or function(s) affected by the identified store relationships are well-typed under typing constraints. For well-typed store relationships, the analysis identifies any potential points-to relationships for types representing non-pointer values in case the analysis subsequently determines in processing other store relationships that the types may represent a pointer value. If the identified store relationships are not well-typed, the analysis modifies types for location (s) and/or function(s) affected by the identified store relationships as necessary so the store relationships are well-typed. The analysis also modifies types for locations and/or functions for potential points-to relationships affected by the modification of types When the locations and/or functions for all identified store relationships are well-typed, the program is well-typed with the set of types defining a store model for the program.

56 Claims, 6 Drawing Sheets

OTHER PUBLICATIONS

Mycroft, Alan, "Polymorphi Type Schemes and Recursive Definitions," *Lecture Notes in Computer Science*, Vol. 167, *Proceedings of the International Symposium on Programming*, 6th Colloquium, Toulouse, pp. 217–228 (Apr. 17–19, 1984).

Talpin, Jean–Pierre, et al., *Syntactic Control of Type Polymorphism for Recursive Function Definitions*, Technical Report ECRC–94–29, European Computer–Industry Research Centre GmbH, pp. I–III, 1–15, and i–xiv (Jul. 1994, Revised Feb. 1995).

Talpin, Jean–Pierre, et al., "Syntactic Type Polymorphism for Recursive Function Definitions," *Workshop on Types for Program Analysis*, pp. 80–94 (May 26–27, 1995).

Andersen, Lars Ole, *Program Analysis and Specialization for the C Programming Language*, Ph.D. Thesis, DIKU, University of Copenhagen, Denmark (May 1994).

Austin, Todd M., et al., "Efficient Detection of All Pointer and Array Access Errors," *SIGPLAN '94 Conference on Programming Language Design and Implementation*, Orlando, Florida, pp. 290–301 (Jun. 1994).

Burke, Michael, et al., "Flow–Insensitive Interprocedural Alias Analysis in the Presence of Pointers", Research Report RC 19546, IBM T.J. Watson Research Center, Yorktown Heights, New York, pp. 1–21 (Sep. 1994).

Chase, David R., et al., "Analysis of Pointers and Structures," *Proceedings of the ACM SIGPLAN '90 Conference on Programming Language Design and Implementation*, White Plains, New York, pp. 296–310 (Jun. 20–22, 1990).

Choi, Jong–Deok, et al., "Efficient Flow–Sensitive Interprocedural Computation of Pointer–Induced Aliases and Side Effects," *Twentieth Annual ACM SIGPLAN–SIGACT Symposium on Principles of Programming Language*, Charleston, South Carolina, pp. 232–245 (Jan. 10–13, 1993).

Choi, Jong–Deok, et al., "On the Efficient Engineering of Ambitious Program Analysis," IEEE Transactions on Software Engineering, Vol. 20, No. 2, pp. 105–114 (Feb. 1994).

Cytron Ron, et al., "Efficiently Computing Static Single Assignment Form and the Control Dependence Graph," *ACM Transactions on Programming Languages and Systems*, Vol. 13, No. 4, pp. 451–490 (Oct. 1991).

Deutsch, Alain, "A Storeless Model of Aliasing and its Abstractions using Finite Representations of Right–Regular Equivalence Relations," *Proceedings of the IEEE 1992 International Conference on Computer Languages*, Oakland, California, pp. 2–13 (Apr. 1992).

Deutsch, Alain, "Interprocedural May–Alias Analysis for Pointers: Beyond k–limiting," *SIGPLAN '94 Conference on Programming Language Design and Implementation*, Orlando, Florida, pp. 230–241 (Jun. 1994).

Emami, Maryam, et al., "Context–Sensitive Interprocedural Points–to Analysis in the Presence of Function Pointers," ACAPS Technical Memo 54, Advanced Compilers, Architectures and Parallel Systems Group, School of Computer Science, McGill University, Montreal, Canada, pp. 1–28 (Nov. 12, 1993).

Henglein, Fritz, "Efficient Type Inference for Higher–Order Binding–Time Analysis," *Functional Programming Languages and Computer Architecture*, 5th ACM Conference, Cambridge, Massachusetts, pp. 448–472 (Aug. 26–30, 1991).

Kahn, G., "Natural Semantics," Lecture Notes in Computer Science, vol. 247, *STACS 87 4th Annual Symposium on Theoretical Aspects of Computer Science*, Passau, Federal Republic of Germany, pp. 22–39 (Feb. 19–21, 1987).

Landi, William, et al., "A Safe Approximate Algorithm for Interprocedural Pointer Aliasing, " *Proceeding of the SIGPLAN '92 Conference on Programming Language Design and Implementation*, pp. 235–248 (Jun. 1992).

Landi, William, et al., "Interprocedural Modification Side Effect Analysis With Pointer Aliasing," *Proceedings of the SIGPLAN '93 Conference on Programming Language Design and Implementation*, pp. 56–67 (Jun. 1993).

O'Callahan, Robert, et al., "Detecting Shared Representations Using Type Inference," Technical Report CMU–CS–95–202, School of Computer Science, Carnegie Mellon University, Pittsburgh, Pennsylvania, pp. 1–21 (Sep. 1995).

Ruf, Erik, "Context–Insensitive Alias Analysis Reconsidered," *SIGPLAN '95 Conference on Programming Language Design and Implementation*, La Jolla, California, pp. 13–22 (Jun. 1995).

Steensgaard, Bjarne, "Sparse Functional Stores for Imperative Programs," *ACM SIGPLAN Workshop on Intermediate Representations (Ir' 95)*, San Francisco, California, pp. 62–70 (Jan. 22, 1995).

Steensgaard, Bjarne "Points–to Analysis by Type Inference of Programs with Structures and Unions," *Lecture Notes on Computer Science, vol. 1060, Proceedings of the 1996 International Conference on Compiler Construction*, Linkobing Sweden, pp. 136–150 (Apr. 24–26, 1996).

Tarjan, Roberts E., *Data Structures and Network Algorithms*, Regional Conference Series in Applied Mathematics, vol. 44, Society for Industrial and Applied Mathematics (SIAM), Table of Contents, pp. v–vi (1983).

Tofte, Mads, et al., "Implementation of the Typed Call–by––Value $\lambda$–calculus using a Stack of Regions," *Proceedings of the 21st ACM SIGPLAN–SIGACT Symposium on Principles of Programming Languages*, Portland, Oregon, pp. 188–201 (Jan. 17–21, 1994).

Weise, Daniel, et al., "Value Dependence Graphs: Representation Without Taxation," *Proceedings of the 21st ACM SIGPLAN–SIGACT Symposium on Principles of Programming Languages*, Portland, Oregon, pp. 297–310 (Jan. 17–21, 1994).

Weise, Daniel et al., "Value Dependence Graphs: Representation Without Taxation," Technical Report MSR–TR–94–03, Microsoft Research, Redmond, Washington, 14 pp. (Apr. 13, 1994).

Weihl, William E., "Interprocedural Data Flow Analysis in the Presence of Pointers, Procedure Variables, and Label Variables," *Seventh Annual ACM Symposium on Principles of Programming Languages*, Las Vegas, Nevada, pp. 83–94 (Jan. 28–30, 1980).

Wilson, Robert P., et al., "Efficient Context–Sensitive Pointer Analysis for C Programs," *SIGPLAN '95 Conference on Programming Language Design and Implementation*, La Jolla, California, pp. 1–12 (Jun. 1995).

Zhang, Sean, et al., "Program Decomposition for Pointer––induced Aliasing Analysis," Technical Report LCS–R–TR–259, Laboratory of Computer Science Research, pp. 1–37 (Mar. 1996).

POINTER ANALYSIS BY TYPE INFERENCE COMBINED WITH A NON-POINTER ANALYSIS

FIELD OF THE INVENTION

The present invention relates generally to the field of computer program analysis. More particularly, the present invention relates to the field of pointer analysis for computer programs.

BACKGROUND OF THE INVENTION

Software compilers compile source code in a source language into target code in a target language. The target code may be executed directly by a data processing system or linked by a suitable linker with other target code for execution by the data processing system.

To help improve the execution of target code by the data processing system, one typical compiler performs optimization techniques based on the expected run-time usage of memory locations for the compiled program as defined by a store model or storage shape graph. The compiler may generate the store model by performing a pointer analysis to determine the effects of program statements referencing memory locations with constants, variables, or functions, for example. One typical pointer analysis by type inference is insensitive to data-flow and may therefore generate an overly conservative store model due to assignments of non-pointer values.

SUMMARY OF THE INVENTION

A method performs a pointer analysis for a program with a data processing system. The method may be implemented in software stored by a memory for execution by a data processing system. The method may perform the pointer analysis for a program browser or while compiling the program for execution by a data processing system.

For the method, a store relationship is identified between locations for the program and may be identified based on a form of a program statement describing the store relationship. The method determines whether types representing the locations for the identified store relationship comply with a typing constraint and may determine whether the types representing the locations for the identified store relationship comply with a type rule specifying the typing constraint for the identified program statement form.

Each type may be represented by a type variable and an associated type constructor and may comprise a location type and a function type to describe a content of a location represented by the type. The type variable may be an equivalence class representative and may be implemented as a fast-union/find data structure.

If the types representing the locations for the identified store relationship do not comply with the typing constraint, types representing locations for the identified store relationship are modified to comply with the typing constraint. Types may be modified by unifying the types. Types may be unified by joining type variables and unifying associated type constructors for the types. Under one typing constraint, types representing locations for the identified store relationship are unified if the types representing locations for the identified store relationship are different and if a select one of the types representing locations for the identified store relationship describes a potential pointer value.

The method identifies from the identified store relationship any potential points-to relationships for a type representing a non-pointer value. The method may identify a potential points-to relationship in a pending list. Types representing locations for any identified potential points-to relationships affected by the modification of types representing locations for the identified store relationship or by the modification of types representing locations for an affected potential points-to relationship may also be modified.

The method may analyze each store relationship for the program only one time in an order independent of program control flow.

A data processing system performing the pointer analysis comprises a translator for translating a program in a first language into code in a second language, a pointer analyzer for performing the pointer analysis for the program, a store model for storing the types representing locations for the program, and an optimizer for optimizing the code based on the store model.

BRIEF DESCRIPTION OF THE DRAWINGS

The present invention is illustrated by way of example and not limitation in the figures of the accompanying drawings, in which like references indicate similar elements and in which.

DETAILED DESCRIPTION

The subject matter of this patent application is disclosed in a conference paper, Steensgaard, B., "Points-to Analysis in Almost Linear Time," *Proceedings of the 23rd ACM SIGPLAN/SIGACT Symposium on Principles of Programming Languages*, St. Petersburg, Fla., pp. 32–41 (Jan. 21–24, 1996). This paper is herein incorporated by reference.

Figure 1:
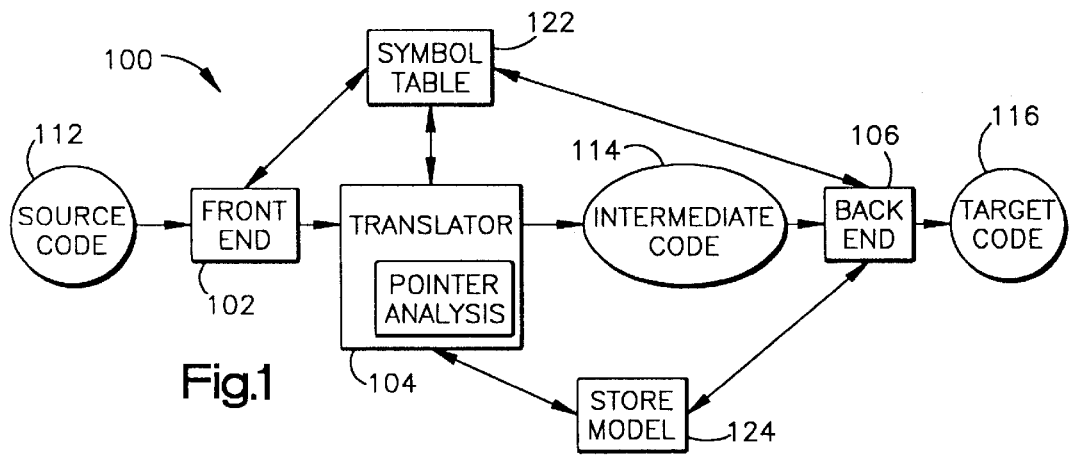
FIG. 1 illustrates for one embodiment a compiler that uses a pointer analysis by type inference combined with a non-pointer analysis in compiling source code.

A pointer analysis by type inference combined with a non-pointer analysis helps approximate run-time store usage for a computer program. This pointer analysis may be used for any suitable programming tool or analyzer, such as a suitable program understanding and browsing tool or a suitable program compiler or interpreter for example. FIG. 1 illustrates for one embodiment a program compiler 100 that uses this pointer analysis.

Compiler 100 is implemented in software for execution by a suitable data processing system and comprises a front end 102, a translator 104, and a back end 106. Compiler 100 compiles source code 112 in a suitable source language into target code 116 in a suitable target language. Target code 116 may be executed directly by a suitable data processing system or linked by a suitable linker with other target code for execution by the data processing system.

Front end 102 is source language dependent and performs suitable lexical, syntax, and semantic analyses, for example, on source code 112. Translator 104 generates suitable intermediate code 114 based on the lexical, syntax, and semantic information generated by front end 102. Back end 106 is machine dependent and generates target code 116 based on intermediate code 114. Compiler 100 generates intermediate code 114 to represent source code 112 independent of the source language for source code 112 and independent of the specific machine or data processing system to execute target code 116.

In analyzing source code 112, front end 102 generates a suitable symbol table 122 in the form of a data structure for recording identifiers, such as variables and function names for example, used in source code 112. Suitable attribute information regarding each recorded identifier is also recorded and referenced for front end 102, translator 104, and back end 106.

As illustrated in FIG. 1, translator 104 performs the pointer analysis. Translator 104 evaluates statements referencing memory locations with variables and/or functions, for example, of source code 112 using symbol table 122 to determine store relationships among the memory locations. Translator 104 generates a store model 124 in the form of a data structure to represent an approximation of the run-time store usage for source code 112. For another embodiment, front end 102 may perform the pointer analysis to generate store model 124 while parsing source code 112. Translator 104 and back end 106 may use store model 124 to help optimize intermediate code 114 and target code 116 with suitable techniques including, for example, code motion, common subexpression elimination, dead code elimination, peephole optimization, and register allocation techniques.

Source Language

Pointer analysis by type inference combined with a non-pointer analysis may be performed for code in any suitable pointer source language that supports, for example, pointers to locations, pointers to functions, dynamic data allocation, data address computation for variables, and/or pointer arithmetic. One suitable source language supports one or more of the following forms of abstract syntax statements S:

$$S ::= x = y$$
$$| \ x = \&y$$
$$| \ x = *y$$
$$| \ x = op(y_1...y_n)$$
$$| \ x = allocate(y)$$
$$| \ *x = y$$
$$| \ x = fun(f_1...f_n) \rightarrow (r_1...r_m)S^*$$
$$| \ x_1...x_m = p(y_1...y_n)$$

where x, y, f, r, and p range over a set of variable names, op ranges over a set of primitive operator names and constants, and S* denotes a sequence of statements.

The x=y statement form describes the assignment of the value of the variable y to the variable x.

The x=&y statement form describes the assignment of the address of the variable y to the variable x so the value of the variable x points to y.

The x=*y statement form describes the assignment of the content of the location pointed-to by the value of the variable y to the variable x.

The x=op($y_1$ . . . $y_n$) statement form describes the performance of the primitive operation identified by op, such as addition, subtraction, etc., on the values of the operand variables $y_1$ . . . $y_n$ and the assignment of the operation result to the variable x. This statement form may describe the computation of offsets into aggregate objects. This statement form may also describe the assignment of a constant to the variable x, such as for the statement x=7 for example.

The x=allocate(y) statement form describes the allocation of a block of memory of size y and the assignment of the address of the allocated block to the variable x so the value of x points to the location for the allocated block.

The *x=y statement form describes the assignment of the value of the variable y to the content of the location pointed-to by the value of the variable x.

The x=fun($f_1$ . . . $f_n$)→($r_1$ . . . $r_m$) S* statement form describes the definition of a function or procedure and the assignment of a pointer to the defined function to the variable x. The function is defined with formal parameter variables $f_1$ . . . $f_n$, return parameter variables $r_1$ . . . $r_m$, and a body represented by the sequence of statements S*. The sequence of statements S* is executed when the function is called.

The $x_1$ . . . $x_m$=p($y_1$ . . . $y_n$) statement form describes the call of a function or procedure pointed-to by the value of the variable p with the values of the parameter variables $y_1$ . . . $y_n$ passed as parameters to the called function and with the values of the return parameter variables for the called function respectively assigned to the variables $x_1$ . . . $x_m$ after execution of the called function.

For one embodiment, the pointer analysis is performed independent of program control flow, and therefore the source language may support any suitable control flow structures. The C programming language is a suitable source language for the pointer analysis.

Types

The pointer analysis uses types to define a store model or storage shape graph representing an approximation of the run-time store usage for a program. A type represents a set of one or more locations and describes the content of those locations. The types define points-to relationships among the sets of locations as determined by the pointer analysis in accordance with typing constraints, and the set of types for a program define the store model for the program. The types used for the pointer analysis are to be distinguished from the types, such as character, integer, long, float, double, etc., associated with type declarations in a program.

To define types for a program in a source language supporting location pointer variables, such as for pointers to locations, dynamic data allocation, and/or data address computation for example, the pointer analysis represents each location for a variable of the program and each dynamically allocated location of the program with a location type. A location type represents a set of one or more locations and comprises a type representing a set of locations that may be pointed-to by the content of the location(s). The pointer analysis describes each location pointer by the type representing the pointed-to location(s).

To define types for a program in a source language supporting function pointer variables, the pointer analysis represents each function of the program with a function type. A function type represents a set of one or more functions and comprises types representing the values of the formal and return parameter variables for the represented function(s). The pointer analysis represents each location for a function pointer variable with a type comprising a function type representing the function(s) pointed-to by the content of the represented location. The pointer analysis describes each function pointer by the type representing the pointed-to function(s).

As values for variables may comprise pointers to locations and pointers to functions for some source languages, the pointer analysis for one embodiment describes the value of a variable with both a location type to describe a location pointer and a function type to describe a function pointer. This typing may be described as follows:

$$\alpha ::= \tau \times \lambda$$

$$\tau ::= \bot \mid ref(\alpha)$$

$$\lambda ::= \bot \mid lam(\alpha_1 \ldots \alpha_n)(\alpha_{n+1} \ldots \alpha_{n+m})$$

That is, the type $\alpha$ describes the content of a location with a location type component $\tau$ and a function type component $\lambda$. Location type components $\tau$ represent locations and location pointers and are either $\bot$ or comprise both a location type component $\tau$ and a function type component $\lambda$. The $\bot$ designation for the location type component $\tau$ indicates the described location-content does not comprise a potential location pointer. Function type components $\lambda$ represent functions and function pointers and comprise types representing the values of the formal and return parameter variables for the represented functions. The $\bot$ designation for the function type component $\lambda$ indicates the described location-content does not comprise a potential function pointer.

The pointer analysis may also describe composite objects, such as records or structures for example, and locations containing constants with types. The pointer analysis for one embodiment may represent the elements of a composite object with a single type and may represent locations containing constants with types similarly as locations containing non-pointer variables.

The pointer analysis for one embodiment represents each type with a type variable in the form of a data structure and an associated type constructor in the form of a data structure. Each type variable represents a set of one or more locations or a set of one or more functions. For one embodiment, each type variable is implemented as an equivalence class representative (ECR) data structure. The data structure may be Tarjan's fast-union/find data structure, for example.

The type constructor associated with a type variable representing a set of locations comprises other type variables describing the content of the represented location(s). Using the above types, a ref type constructor comprises a location type component $\tau$ and a function type component $\lambda$. The location type component $\tau$ and the function type component $\lambda$ are each represented with a type variable and an associated type constructor.

The type constructor associated with a type variable representing a set of functions for one embodiment comprises other type variables representing the values of the formal and return parameter variables for the represented function(s). Using the above types, a lam type constructor comprises a location type component $\tau$ and a function type component $\lambda$ for each formal and return parameter variable of the represented function(s). The location type component $\tau$ and the function type component $\lambda$ are each represented with a type variable and an associated type constructor. For another embodiment, the type constructor associated with a type variable representing a set of functions comprises other type variables representing the locations of the formal and return parameter variables for the represented function(s).

Figure 2:
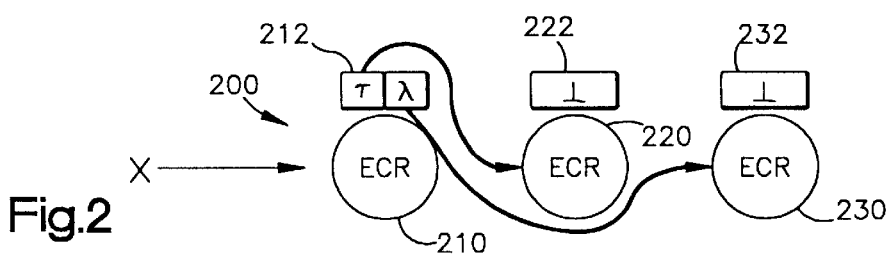
FIG. 2 illustrates for one embodiment a graphical representation of a type describing a non-pointer variable.

FIG. 2 illustrates for one embodiment a graphical representation of a type 200 describing a location representing a non-pointer variable x. Type 200 is represented by a type variable 210 implemented as an equivalence class representative (ECR) with an associated ref type constructor 212. Type variable 210 represents the execution time location(s) representing the variable x.

Type constructor 212 comprises a location type component $\tau$ represented by an ECR type variable 220 with an associated type constructor 222. Type variable 220 represents the location pointers stored in the location(s) representing the variable x, and type constructor 222 is $\bot$ indicating the content of the location(s) representing the variable x does not comprise a location pointer. Type constructor 212 also comprises a function type component $\lambda$ implemented as an ECR type variable 230 with an associated type constructor 232. Type variable 230 represents the function pointers stored in the location(s) representing the variable x, and type constructor 232 is $\bot$ indicating the content of the location(s) representing the variable x does not comprise a function pointer.

Figure 3:
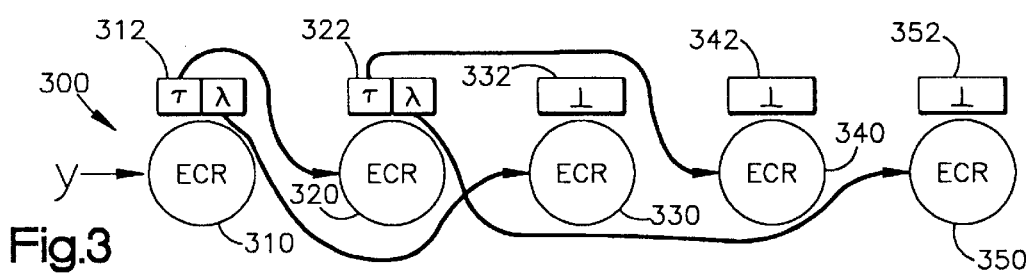
FIG. 3 illustrates for one embodiment a graphical representation of a type describing a location pointer variable and the pointed-to location or locations.

FIG. 3 illustrates for one embodiment a graphical representation of a type 300 describing a location representing a variable y that may contain a pointer to another location. Type 300 is represented by a type variable 310 implemented as an equivalence class representative (ECR) with an associated ref type constructor 312. Type variable 310 represents the execution time location(s) representing the variable y.

Type constructor 312 comprises a location type component $\tau$ represented by an ECR type variable 320 with an associated ref type constructor 322. Type constructor 312 also comprises a function type component $\lambda$ implemented as an ECR type variable 330 with an associated type constructor 332. Type variable 330 represents the function pointers stored in the location(s) representing the variable y, and type constructor 332 is $\bot$ indicating the content of the location(s) representing the variable y does not comprise a function pointer.

Type variable 320 represents the location pointers stored in the location(s) representing the variable y. Type constructor 322 comprises a location type component $\tau$ represented by an ECR type variable 340 with an associated type constructor 342. Type variable 340 represents the location pointers stored in the location(s) represented by type variable 320, and type constructor 342 is $\bot$ indicating the content of the location(s) represented by type variable 320 does not comprise a potential location pointer. Type constructor 322 also comprises a function type component $\lambda$ implemented as an ECR type variable 350 with an associated type constructor 352. Type variable 350 represents the function pointers stored in the location(s) represented by type variable 320, and type constructor 352 is $\bot$ indicating the content of the location(s) represented by type variable 320 does not comprise a potential function pointer.

Type Rules

The pointer analysis describes the locations and functions for a program with types so the set of types defining the store model for the program is a valid description of all possible run-time storage configurations for a program. For the program to be typed in this manner, or well-typed, the pointer analysis identifies store relationships, including pointer relationships, among the locations and functions for the program and describes the locations and functions for the program with types in accordance with typing constraints based on the store relationships.

For a well-typed program, the pointer analysis represents each location for the program with a single type and describes each location pointer for the program with a type representing the pointed-to location(s). If a location pointer may point to either one of two locations, the pointer analysis represents the two locations with the same type and describes the location pointer with the type representing both locations. If two location pointers may point to the same location, the pointer analysis describes each of the two location pointers with the type representing the pointed-to location.

Likewise, the pointer analysis for a well-typed program represents each function for the program with a single type and describes each function pointer for the program with a type representing the pointed-to function(s). If a function pointer may point to either one of two functions, the pointer analysis represents the two functions with the same type and describes the function pointer with the type representing both functions. If two function pointers may point to the same function, the pointer analysis describes each of the two function pointers with the type representing the pointed-to function.

The pointer analysis applies the typing constraints for a well-typed program based on store relationships among the locations and functions for the program. For one embodiment, the pointer analysis identifies store relationships based on the form of each program statement referencing one or more locations or functions. The pointer analysis describes locations and functions affected by the store relationships with types in accordance with a type rule specifying the typing constraints for the statement form so the description of the store as defined by the store model is valid both before and after execution of the statement. If each program statement referencing one or more locations or functions is typed in this manner, or well-typed, the program is well-typed. For one embodiment, the type rules for well-typed statements S are as follows.

For a statement in the form x=y, both the value of the variable x and the value of the variable y will point to the same location or function after execution of the statement if the value of the variable y is a pointer. The value of the variable x and the value of the variable y are therefore to be described by the same non-$\bot$ type if the value of the variable y may comprise a pointer.

Using the above types, this type rule is described as:

$$\frac{A \vdash x : ref(\alpha_1) \qquad A \vdash y : ref(\alpha_2) \qquad \alpha_2 \leq \alpha_1}{A \vdash welltyped(x = y)}$$

That is, a statement in the form x=y is well-typed under the typing environment A if the type $\alpha_2$ describing the value of the variable y and the type $\alpha_1$ describing the value of the variable x satisfy the inequality constraint $\alpha_2 \leq \alpha_1$, where ref($\alpha_1$) represents the location representing the variable x and ref ($\alpha_2$) represents the location representing the variable y.

The typing environment A associates all variables for a program with a type and represents the store model for the program. A$\bullet$x:$\tau$ holds true if and only if the variable x is associated with the type $\tau$ in the typing environment A.

Using the above types, the inequality constraint is described as:

$$t_1 \leq t_2 \Leftrightarrow (t_1 = \bot) \vee (t_1 = t_2)$$

$$(t_1 \times t_2) \leq (t_3 \times t_4) \Leftrightarrow (t_1 \leq t_3) \wedge (t_2 \leq t_4)$$

That is, the inequality constraint $t_1 \leq t_2$ is satisfied if either type $t_1$ is $\bot$ or type $t_1$ is equal to type $t_2$. Two types are equal if and only if they are the same or are both $\bot$. The inequality constraint $(t_1 \times t_2) \leq (t_3 \times t_4)$ is satisfied if both the inequality constraint $t_1 \leq t_3$ and the inequality constraint $t_2 \leq t_4$ are satisfied.

The statement in the form x=y is well-typed under the typing environment A, then, if the location type component $\tau$ for the type $\alpha_2$ describing the value of the variable y is either $\bot$ or the same as the location type component $\tau$ for the type $\alpha_1$ describing the value of the variable x and if the function type component $\lambda$ for the type $\alpha_2$ is either $\bot$ or the same as the function type component $\lambda$ for the type $\alpha_1$. The value of the variable x and the value of the variable y are therefore to be described by the same location type and/or function type if the value of the variable y may comprise a location pointer and/or function pointer, respectively.

For a statement in the form x=&y, the value of the variable x will be a pointer to the location representing the variable y after execution of the statement. The value of the variable x is therefore to be described by the type representing the location representing the variable y.

Using the above types, this type rule is described as:

$$\frac{A \vdash x : ref(\tau_1 \times \_) \qquad A \vdash y : \tau_2 \qquad \tau_1 = \tau_2}{A \vdash welltyped(x = \&y)}$$

That is, a statement in the form x=&y is well-typed under the typing environment A if the location type $\tau_2$ representing the location representing the variable y is the same as the location type $\tau_1$ describing the value of the variable x, where "$\_$" is a wild-card or don't care value and ref($T_1$x$\_$) represents the location representing the variable x.

For a statement in the form x=*y, both the value of the variable x and the content of the location(s) pointed-to by the value of the variable y will point to the same location or function after execution of the statement if the content of the location(s) pointed-to by y is a pointer. The value of the variable x and the content of the location(s) pointed-to by y are therefore to be described by the same non-$\bot$ type if the content of the location(s) pointed-to by y may comprise a pointer.

Using the above types, this type rule is described as:

$$\frac{A \vdash x : ref(\alpha_1) \qquad A \vdash y : ref(\tau_1 \times \_) \qquad \tau_1 = ref(\alpha_2) \qquad \alpha_2 \leq \alpha_1}{A \vdash welltyped(x = *y)}$$

That is, a statement in the form x=*y is well-typed under the typing environment A if the type $\alpha_2$ describing the content of the location(s) pointed-to by the value of the variable y and the type $\alpha_1$ describing the value of the variable x satisfy the inequality constraint $\alpha_2 \leq \alpha_1$, where ref($\alpha_1$) represents the location representing the variable x, ref ($\tau_1$x$\_$) represents the location representing the variable y, and $\tau_1$ and ref($\alpha_2$) represent the location(s) pointed-to by the value of the variable y.

For a statement in the form x=op($y_1$ . . . $y_n$), for one embodiment, the value of the variable x and the value of any one operand variable $y_i$ of the operand variables $y_1$ . . . . $y_n$ are to be described by the same non-$\bot$ type if the value of the operand variable $y_i$ may comprise a pointer.

Using the above types, this type rule is described as:

$$A \vdash x : ref(\alpha)$$
$$A \vdash y_i : ref(\alpha_i)$$
$$\forall\ i \in [1 \ldots n] : \alpha_i \leq \alpha$$
$$\overline{A \vdash welltyped(x = op(y_1 \ldots y_n))}$$

That is, a statement in the form $x = oP(y_i \ldots y_n)$ is well-typed under the typing environment A if the type $\alpha_1$ describing the value of each one of the operand variables $y_1 \ldots y_n$ and the type a describing the value of the variable x satisfy the inequality constraint $\alpha_i \leq \alpha$, where ref($\alpha$) represents the location representing the variable x and ref($\alpha_i$) represents the location representing the operand variable $y_i$.

The type rule for a statement in the form $x = op(y_1 \ldots y_n)$, for other embodiments, may depend on the operation identified by op. For some operations, such as a < or ≠ comparison operation for example, the result of the operation and therefore the value assigned to the variable x is not a pointer regardless of whether the value of any one of the operand variables $y_1 \ldots y_n$ may comprise a pointer. The value of the variable x may therefore be described with a type different from the type describing the value of any one of the operand variables $y_1 \ldots y_n$ while maintaining the well-typedness of the statement. For embodiments where the source language does not support pointer arithmetic, the value of the variable x may be described with a type different from the type describing the value of any one of the operand variables $y_1 \ldots y_n$ while maintaining the well-typedness of the statement.

For a statement in the form x=allocate(y), the value of the variable x will be a pointer to the allocated memory block after execution of the statement and is therefore to be described by the type representing the location for the allocated memory block.

Using the above types, this type rule is described as:

$$A \vdash x : ref(\tau_1 \times \_)$$
$$\tau_1 = ref(\_ \times \_)$$
$$\overline{A \vdash welltyped(x = allocate(y))}$$

That is, a statement in the form x=allocate(y) is well-typed under the typing environment A if the value of the variable x is described by a non-⊥ location type $\tau_1$ representing the location(s) pointed-to by the value of the variable x, where ref ($\tau_1 x\_$) represents the location representing the variable x.

For a statement in the form *x=y, both the value of the variable y and the content of the location(s) pointed-to by the value of the variable x will point to the same location or function after execution of the statement if the value of the variable y is a pointer. The value of the variable y and the content of the location(s) pointed-to by x are therefore to be described by the same non-⊥ type if the value of the variable y may comprise a pointer.

Using the above types, this type rule is described as:

$$A \vdash x : ref(\tau_1 \times \_)$$
$$\tau_1 = ref(\alpha_1)$$
$$A \vdash y : ref(\alpha_2)$$
$$\alpha_2 \leq \alpha_1$$
$$\overline{A \vdash welltyped(\ast x = y)}$$

That is, a statement in the form *x=y is well-typed under the typing environment A if the type $\alpha_2$ describing the value of the variable y and the type $\alpha_1$ describing the content of the location(s) pointed-to by the value of the variable x satisfy the inequality constraint $\alpha_2 \leq \alpha_1$, where ref ($\tau_1 x\_$) represents the location representing the variable x, $\tau_1$ and ref($\alpha_1$) represent the location(s) pointed-to by the value of the variable x, and ref ($\alpha_2$) represents the location representing the variable y.

For a statement in the form $x = fun(f_1 \ldots f_n) \rightarrow (r_1 \ldots r_m)$ S*, the value of the variable x will be a pointer to a function after execution of the statement. The values of the variables $f_1 \ldots f_n$ and $r_1 \ldots r_m$ and the values of the formal and return parameter variables for all the functions potentially pointed-to by the value of the variable x are to be described by the same type, respectively. The sequence of statements S* must also be well-typed.

Using the above types, this type rule is described as:

$$A \vdash x : ref(\_ \times \lambda_1)$$
$$\lambda_1 = lam(\alpha_1 \ldots \alpha_n)(\alpha_{n+1} \ldots \alpha_{n+m})$$
$$A \vdash f_i : ref(\alpha_i')$$
$$A \vdash r_j : ref(\alpha_{n+j}')$$
$$\forall\ k \in [1 \ldots n+m] : \alpha_k' = \alpha_k$$
$$\forall\ s \in S^* : A \vdash welltyped(s)$$
$$\overline{A \vdash welltyped(x = fun(f_1 \ldots f_n) \rightarrow (r_1 \ldots r_m)S^*)}$$

That is, a statement in the form $x = fun(f_1 \ldots f_n) \rightarrow (r_1 \ldots r_m)$ S* is well-typed under the typing environment A if the type $\alpha_k$ describing the value of each one of the variables $f_1 \ldots f_n$ and $r_1 \ldots r_m$ is the same as the respective type $\alpha_k$ describing the value of each one of the formal and return parameter variables for all the functions potentially pointed-to by the value of the variable x and if each statement s of the sequence of statements S* is well-typed under the typing environment A, where ref($\_x\lambda_1$) represents the location representing the variable x, $\lambda_1$ and lam($\alpha_1 \ldots \alpha_n$)($\alpha_{n+1} \ldots \alpha_{n+m}$) represent the function(s) potentially pointed-to by the value of the variable x, ref($\alpha_1$) represents the location representing the variable $f_i$, and ref ($\alpha_{n+j}$) represents the location representing the variable $r_j$.

For a statement in the form $x_1 \ldots x_m = p(y_1 \ldots y_n)$, the values of the variables $y_1 \ldots y_n$ are assigned to the formal parameter variables for the function or procedure pointed-to by the value of the variable p before execution of the function, and the values of the return parameter variables for the called function are assigned to the variables $x_1 \ldots x_m$ after execution of the called function. Both the value of each variable $y_1 \ldots y_n$ and the value of each corresponding formal parameter variable for the called function are to be described by the same non-⊥ type if the value of the corresponding variable $y_1 \ldots y_n$ may comprise a pointer, and both the value of each variable $x_1 \ldots x_m$ and the value of each corresponding return parameter variable for the called function are to be described by the same non-⊥ type if the value of the corresponding return parameter variable may comprise a pointer.

Using the above types, this type rule is described as:

$$A \vdash x_j : ref(\alpha'_{n+j})$$
$$A \vdash p : ref(\_ \times \lambda_1)$$
$$\lambda_1 = lam(\alpha_1 \ldots \alpha_n)(\alpha_{n+1} \ldots \alpha_{n+m})$$
$$A \vdash y_i : ref(\alpha'_i)$$
$$\forall \; i \in [1 \ldots n] : \alpha'_i \leq \alpha_i$$
$$\forall \; j \in [1 \ldots m] : \alpha_{n+j} \leq \alpha'_{n+j}$$
$$\overline{A \vdash welltyped(x_1 \ldots x_m = p(y_1 \ldots y_n))}$$

That is, a statement in the form $x_1 \ldots x_m = p(y_1 \ldots y_n)$ is well-typed under the typing environment A if the type $\alpha_i$ describing the value of the variable $y_i$ and the type $\alpha'_i$ describing the value of the corresponding formal parameter variable for all the potentially called functions satisfy the inequality constraint $\alpha'_i \leq \alpha_i$ and if the type $\alpha_{n+j}$ describing the value of each return parameter variable for all the potentially called functions and the type $\alpha'_{n+j}$ describing the value of the corresponding variable $x_j$ satisfy the inequality constraint $\alpha_{n+j} \leq \alpha'_{n+j}$, where ref($\alpha'_{n+j}$) represents the location representing the variable $x_j$, ref($\_ \times \lambda_1$) represents the location representing the variable p, $\lambda_1$ and lam($a_1 \ldots \alpha_n$) ($\alpha_{n+1} \ldots \alpha_{n+m}$) represent the function(s) potentially pointed-to by the value of the variable p, and ref($\alpha_i$) represents the location representing the variable $y_i$.

Analysis

Figure 4:
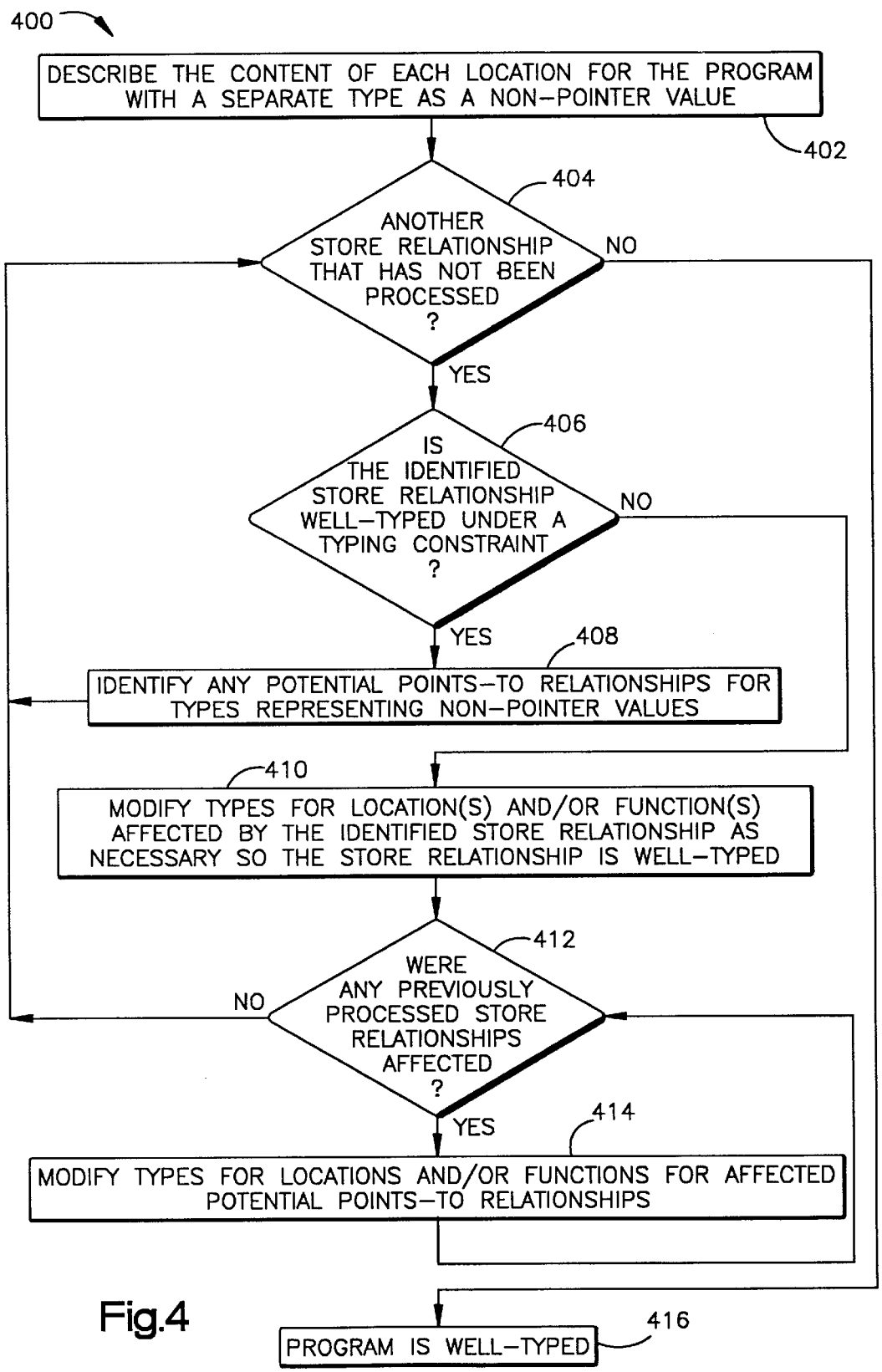
FIG. 4 illustrates for one embodiment a flow diagram for performing a pointer analysis by type inference combined with a non-pointer analysis for a program.

FIG. 4 illustrates for one embodiment a flow diagram 400 for performing a pointer analysis by type inference combined with non-pointer analysis for a program.

For step 402 of FIG. 4, the analysis describes the content of each location for the program with a separate type as a non-pointer value. The analysis for one embodiment describes the value of each variable for the program with an initial location type comprising a ⊥ location type component τ and a ⊥ function type component λ. FIG. 2 illustrates this initial type. By representing each variable of the program with a type, the analysis defines a typing environment for the program. The analysis for one embodiment identifies each location for the program using a symbol table having recorded identifiers for each variable for the program.

For step 404, the analysis identifies a store relationship that is described by the program and has not been processed by the analysis. The analysis for one embodiment identifies the form of a statement of the program to identify the store relationship or relationships described by the statement.

If the analysis identifies a store relationship that has not been processed, the analysis for step 406 determines whether the location(s) and/or function(s) affected by the identified store relationship are well-typed for the current typing environment under a typing constraint. For one embodiment, the analysis determines whether the program statement describing the identified store relationship(s) is well-typed for the current typing environment in accordance with a type rule specifying the typing constraint for the form of the statement.

If the analysis determines an identified store relationship is well-typed, the analysis for step 408 identifies any potential points-to relationships for types representing only non-pointer values in the current typing environment and proceeds to process another store relationship for step 404. The analysis identifies potential points-to relationships in case the analysis determines in processing other store relationships that the type representing only non-pointer values in the current typing environment may represent a pointer value in a subsequent typing environment. For one embodiment, the analysis identifies potential points-to relationships in a separate pending set associated with the type representing the non-pointer values. Each pending set for one embodiment is a pending bag implemented as a binary tree data structure. For another embodiment, all potential points-to relationships identified for the program may be identified in a single pending set.

If the analysis for step 406 determines the identified store relationship is not well-typed for the current typing environment under the typing constraint, the analysis for step 410 modifies types for location(s) and/or function(s) affected by the identified store relationship as necessary so the store relationship is well-typed under the typing constraint. For one embodiment, the analysis modifies types in accordance with a type rule specifying the typing constraint for the form of the program statement describing the identified store relationship. The analysis modifies types for one embodiment by unifying types and/or by replacing ⊥ types with non-⊥ types.

For step 412, the analysis determines whether any previously processed store relationships were affected by the modification of types for step 410. The analysis determines whether a type representing only non-pointer values has come to represent a potential pointer value as a result of the modification of types and, if so, whether this determination affects any potential points-to relationships identified for step 408. For one embodiment, the affected points-to relationships are determined by the pending set associated with the type that came to represent a potential pointer value. If any previously processed store relationships were affected as determined for step 412, the analysis for step 414 modifies types for locations and/or functions for the affected potential points-to relationships and repeats steps 412 and 414 as potential points-to relationships are affected by the modification of types for step 414.

If the analysis determines for step 412 that no previously processed store relationships were affected by steps 410 or 414, the analysis proceeds to process another store relationship for steps 404 through 414 until the analysis determines for step 404 that all store relationships for the program have been processed. The analysis for one embodiment determines whether the last statement referencing a location and/or function for the program has been identified. When the analysis has processed all store relationships for the program, the program is well-typed for step 416.

For one embodiment, the analysis for FIG. 4 may process each store relationship described by the program in any order independent of program control flow as defined by the control flow structures for the program. The analysis processes each store relationship for the program only one time.

The analysis for steps 404 through 414 is implemented with the above type rules for one embodiment as follows.

If the form of the statement is identified as x=y for step 404, the analysis processes the store relationship for this statement in accordance with the following representative pseudo-code:

$$x = y :$$
$$\text{let } ref(\tau_1 \times \lambda_1) = \text{type}(ecr(x))$$
$$ref(\tau_2 \times \lambda_2) = \text{type}(ecr(y)) \text{ in}$$
$$\text{if } \tau_1 \neq \tau_2 \text{ then } cjoin\,(\tau_1, \tau_2)$$
$$\text{if } \lambda_1 \neq \lambda_2 \text{ then } cjoin\,(\lambda_1, \lambda_2)$$

ecr(x):
  Returns the type variable implemented as an equivalence class representative (ECR) for the type associated with the variable x in the typing environment type(E):
  Returns the type constructor associated with the ECR E That is, the analysis determines for step 406 whether the equivalence class representative (ECR) $\tau_1$ for the location type describing the value of the variable x is the same as the ECR $\tau_2$ for the location type describing the value of the variable y. If the ECRs $\tau_1$ and $\tau_2$ are not the same, the analysis for step 410 joins the ECRs $\tau_1$ and $\tau_2$ on the condition that the run-time values described by the type represented by the ECR $\tau_2$ comprise a potential location pointer value so that the values of the variables x and y are described by the same type representing the location(s) that may be pointed-to by the values of the variables x and y.

The analysis also determines for step 406 whether the ECR $\lambda_1$ for the function type describing the value of the variable x is the same as the ECR $\lambda_2$ for the function type describing the value of the variable y. If the ECRs $\lambda_1$ and $\lambda_2$ are not the same, the analysis for step 410 joins the ECRs $\lambda_1$ and $\lambda_2$ on the condition that the run-time values described by the type represented by the ECR $\lambda_2$ comprise a potential function pointer value so that the values of the variables x and y are described by the same type representing the function(s) that may be pointed-to by the values of the variables x and y.

The analysis for steps 408 and 410 conditionally joins the ECRs for types in accordance with the following representative pseudo-code:

```
cjoin (e_1,e_2):
  if type (e_2) = ⊥ then
    pending (e_2)←{e_1} ∪ pending(e_2)
  else
    join (e_1,e_2)
```

That is, the analysis determines whether the type constructor associated with the ECR $e_2$ is $\bot$ indicating the run-time values described by the type represented by the ECR $e_2$ do not comprise a potential pointer value. If the described run-time values do not comprise a potential pointer value, the analysis for step 408 identifies the ECR $e_1$ in a pending set for the ECR $e_2$ in case the analysis subsequently determines the described run-time values comprise a potential pointer value. If the described run-time values comprise a potential pointer value, the analysis for step 410 joins the ECRs $e_1$ and $e_2$.

The analysis for steps 410, 412, and 414 joins the ECRs for types in accordance with the following representative pseudo-code:

```
join (e_1,e_2):
  let t_1 = type (e_1)
      t_2 = type (e_2)
      e = ecr-union (e_1,e_2) in
  if t_1 = ⊥ then
    type (e)←t_2
    if t_2 = ⊥ then
      pending (e)←pending (e_1) ∪ pending (e_2)
    else
      for x ∈ pending (e_1) do join (e,x)
  else
    type (e)←t_1
    if t_2 = ⊥ then
      for x ∈ pending (e_2) do join (e,x)
    else
      unify (t_1,t_2)
``` ecr-union($e_1$, $e_2$):
  Performs a fast-union/find union operation on the ECRs $e_1$ and $e_2$ and returns the value of a subsequent find operation on one of them That is, the analysis combines the ECRs $e_1$ and $e_2$ to form an ECR e and determines whether the type constructor associated with each ECR $e_1$ and $e_2$ is $\bot$ indicating the respective run-time values described by the type represented by ECR $e_1$ and $e_2$ do not comprise a potential pointer value.

If the run-time values described by each ECR $e_1$ and $e_2$ do not comprise a potential pointer value, the analysis sets the type constructor associated with the ECR e to $\bot$ and identifies in a pending set for the ECR e each ECR identified in a pending set for the ECRs $e_1$ and $e_2$.

If the run-time values described by the ECR $e_1$ do not comprise a potential pointer value but the run-time values described by the ECR $e_2$ comprise a potential pointer value, the analysis sets the type constructor associated with the ECR e to be the same as that associated with the ECR $e_2$ and joins the ECR e with each ECR identified in a pending set for the ECR $e_1$.

If the run-time values described by the ECR $e_1$ comprise a potential pointer value but the run-time values described by the ECR $e_2$ do not comprise a potential pointer value, the analysis sets the type constructor associated with the ECR e to be the same as that associated with the ECR $e_1$ and joins the ECR e with each ECR identified in a pending set for the ECR $e_2$.

If the run-time values described by each ECR $e_1$ and $e_2$ comprise a potential pointer value, the analysis unifies the type constructors associated with the ECRs $e_1$ and $e_2$ to form the type constructor associated with the ECR e.

The analysis unifies type constructors for location types in accordance with the following representative pseudo-code:

```
unify (t_1,t_2):
  ref (τ_1 × λ_1) = t_1
  ref (τ_2 × λ_2) = t_2
  if τ_1 ≠ τ_2 then join (τ_1,τ_2)
  if λ_1 ≠ λ_2 then join (λ_1,λ_2)
```

That is, the analysis unifies type constructors $t_1$ and $t_2$ by joining the ECR $\tau_1$ for the location type component of the type constructor $t_1$ and the ECR $\tau_2$ for the location type component of the type constructor $t_2$ if the ECRs $\tau_1$ and $\tau_2$ are not the same and by joining the ECR $\lambda_1$ for the function type component of the type constructor $t_1$ and the ECR $\lambda_2$ for the function type component of the type constructor $t_2$ if the ECRs $\lambda_1$ and $\lambda_2$ are not the same.

The analysis unifies type constructors for function types in accordance with the following representative pseudo-code:

```
unify (t_1,t_2)
  lam (α_1 ... α_n) (α_{n+1} ... α_{n+m}) = t_1
  lam (α_1 ... α_n) (α_{n+1} ... α_{n+m}) = t_2
```

-continued

```
for i ∈ [1 . . . (n+m)] do
  let   τ₁ × λ₁ = αᵢ,
        τ₂ × λ₂ = αᵢ in
    if τ₁ ≠ τ₂ then join (τ₁,τ₂)
    if λ₁ ≠ λ₂ then join (λ₁,λ₂)
```

That is, the analysis unifies type constructors $t_1$ and $t_2$ by joining the ECR $\tau_1$ for the location type component for each type $\alpha_1 \ldots \alpha_{n+m}$ of the type constructor $t_1$ and the ECR $\tau_2$ for the location type component for each type $\alpha_1 \ldots \alpha_{n+m}$ of the type constructor $t_2$ if the ECRs $\tau_1$ and $\tau_2$ are not the same and by joining the ECR $\lambda_1$ for the function type component for each type $\alpha_1 \ldots \alpha_{n+m}$ of the type constructor $t_1$ and the ECR $\lambda_2$ for the function type component for each type $\alpha_1 \ldots \alpha_{n+m}$ of the type constructor $t_2$ if the ECRs $\lambda_1$ and $\lambda_2$ are not the same.

If the form of the statement is identified as x=&y for step 404, the analysis processes the store relationship for this statement in accordance with the following representative pseudo-code:

```
x = &y:
  let ref (τ₁ x_) = type (ecr (x))
      τ₂ = ecr (y) in
    if τ₁ ≠ τ₂ then join (τ₁,τ₂)
```

That is, the analysis determines for step 406 whether the ECR $\tau_1$ for the location type describing the value of the variable x is the same as the ECR $\tau_2$ for the location type describing the location representing the variable y. If the ECRs $\tau_1$ and $\tau_2$ are not the same, the analysis for step 410 joins the ECRs $\tau_1$ and $\tau_2$ so that the location representing the variable y and the value of the variable x are described by the same type representing the location(s) pointed-to by the value of the variable x.

If the form of the statement is identified as x=*y for step 404, the analysis processes the store relationship for this statement in accordance with the following representative pseudo-code:

```
x = *y:
  let ref (τ₁ × λ₁) = type (ecr (x))
      ref (τ₂ × _) = type (ecr (y)) in
    if type (τ₂) = ⊥ then
      let [τ,λ] = MakeECR (2) in
        settype (τ₂,ref (τ × λ))
    let ref (τ₃ × λ₃) = type (τ₂) in
      if τ₁ ≠ τ₃ then cjoin (τ₁,τ₃)
      if λ₁ ≠ λ₃ then cjoin (λ₁,λ₃)
```

MakeECR(x):
Returns a list of x new ECRs, each with an associated ⊥ type constructor That is, the analysis determines for step 406 whether the type constructor associated with the ECR $\tau_2$ for the location type describing the value of the variable y is ⊥ indicating the run-time values described by the type represented by the ECR $\tau_2$ do not comprise a potential pointer value, and, if so, the analysis modifies the type constructor associated with the ECR $\tau_2$ to a location type constructor comprising a newly created location type component represented by the ECR $\tau$ and a newly created function type component represented by the ECR $\lambda$ so that the value of the variable y is described by a type indicating the value of the variable y may comprise a pointer value.

The analysis also determines for step 406 whether the ECR $\tau_1$ for the location type describing the value of the variable x is the same as the ECR $\tau_3$ for the location type describing the content of the location(s) pointed-to by the value of the variable y. If the ECRs $\tau_1$ and $\tau_3$ are not the same, the analysis for step 410 joins the ECRs $\tau_1$ and $\tau_3$ on the condition that the run-time values described by the type represented by the ECR $\tau_3$ comprise a potential location pointer value so that the value of the variable x and the content of the location(s) pointed-to by the value of the variable y are described by the same type representing the location(s) that may be pointed-to by both values.

The analysis further determines for step 406 whether the ECR $\lambda_1$ for the function type describing the value of the variable x is the same as the ECR $\lambda_3$ for the function type describing the content of the location(s) pointed-to by the value of the variable y. If the ECRs $\lambda_1$ and $\lambda_3$ are not the same, the analysis for step 410 joins the ECRs $\lambda_1$ and $\lambda_3$ on the condition that the run-time values described by the type represented by the ECR $\lambda_3$ comprise a potential function pointer value so that the value of the variable x and the content of the location(s) pointed-to by the value of the variable y are described by the same type representing the function(s) that may be pointed-to by both values.

The analysis for steps 410, 412, and 414 replaces a ⊥ type constructor associated with an ECR with a non-⊥ type constructor in accordance with the following representative pseudo-code:

```
settype (e,t):
  type (e)←t
  for x ∈ pending (e) do join (e,x)
```

That is, the analysis for step 410 replaces the ⊥ type constructor associated with the ECR e with the type constructor t and for steps 412 and 414 joins the ECR e with each ECR identified in the pending set for the ECR e.

If the form of the statement is identified as x=op($y_1 \ldots y_n$) for step 404, the analysis processes the store relationship (s) for this statement in accordance with the following representative pseudo-code:

```
x = op (y₁ . . . yₙ):
  for i ∈ [1 . . . n] do
    let   ref(τ₁ × λ₁) = type (ecr (x))
          ref (τ₂ × λ₂) = type (ecr (yᵢ)) in
      if τ₁ ≠ τ₂ then cjoin (τ₁,τ₂)
      if λ₁ ≠ λ₂ then cjoin (λ₁,λ₂)
```

That is, the analysis determines for step 406 whether the ECR $\tau_1$ for the location type describing the value of the variable x is the same as the ECR $\tau_2$ for the location type describing the value of each one of the operand variables $y_1 \ldots y_n$. If the ECRs $\tau_1$ and $\tau_2$ are not the same, the analysis for step 410 joins the ECRs $\tau_1$ and $\tau_2$ on the condition that the run-time values described by the type represented by the ECR T2 comprise a potential location pointer value so that the value of the variable x and the value of the respective operand variable $y_1 \ldots y_n$ are described by the same type representing the location(s) that may be pointed-to by both values.

The analysis also determines for step 406 whether the ECR $\lambda_1$ for the function type describing the value of the variable x is the same as the ECR $\lambda_2$ for the function type describing the value of each one of the operand variables $y_1 \ldots y_n$. If the ECRs $\lambda_1$ and $\lambda_2$ are not the same, the analysis for step 410 joins the ECRs $\lambda_1$ and $\lambda_2$ on the condition that the run-time values described by the type represented by the ECR $\lambda_2$ comprise a potential function pointer value so that the value of the variable x and the value of the respective operand variable $y_1 \ldots y_n$ are described by the same type representing the function(s) that may be pointed-to by both values.

If the form of the statement is identified as x=allocate(y) for step 404, the analysis processes the store relationship for this statement in accordance with the following representative pseudo-code:

```
x = allocate (y):
    let ref (τ × _) = type (ecr (x)) in
        if type (τ) = ⊥ then
            let [τ₁,λ₁] = Make ECR (2) in
                settype (τ,ref (τ₁ × λ₁))
```

That is, the analysis determines for step 406 whether the type constructor associated with the ECR $\tau$ for the location type describing the value of the variable x is $\bot$ indicating the run-time values described by the type represented by the ECR $\tau$ do not comprise a potential pointer value, and, if so, the analysis for step 410 modifies the type constructor associated with the ECR $\tau$ to a location type constructor comprising a newly created location type component represented by the ECR $\tau_1$ and a newly created function type component represented by the ECR $\lambda_1$ so that the value of the variable x is described by a type indicating the value of the variable x may comprise a pointer value.

If the form of the statement is identified as *x=y for step 404, the analysis processes the store relationship for this statement in accordance with the following representative pseudo-code:

```
*x = y:
    let ref (τ₁ × _) = type (ecr (x))
        ref (τ₂ × λ₂) = type (ecr (y)) in
            if type (τ₁) = ⊥ then
                let [τ,λ] = MakeECR (2) in
                    settype (τ₁,ref (τ × λ))
            let ref (τ₃ × λ₃) = type (τ₁)
                if τ₂ ≠ τ₃ then cjoin (τ₃,τ₂)
                if λ₂ ≠ λ₃ then cjoin (λ₃,λ₂)
```

That is, the analysis determines for step 406 whether the type constructor associated with the ECR $\tau_1$ for the location type describing the value of the variable x is $\bot$ indicating the run-time values described by the type represented by the ECR $\tau_1$ do not comprise a potential pointer value, and, if so, the analysis modifies the type constructor associated with the ECR $\tau_1$ to a location type constructor comprising a newly created location type component represented by the ECR $\tau$ and a newly created function type component represented by the ECR $\lambda$ so that the value of the variable x is described by a type indicating the value of the variable x may comprise a pointer value.

The analysis also determines for step 406 whether the ECR $\tau_2$ for the location type describing the value of the variable y is the same as the ECR $\tau_3$ for the location type describing the content of the location(s) pointed-to by the value of the variable x. If the ECRs $\tau_2$ and $\tau_3$ are not the same, the analysis for step 410 joins the ECRs $\tau_2$ and $\tau_3$ on the condition that the run-time values described by the type represented by the ECR $\tau_3$ comprise a potential location pointer value so that the value of the variable y and the content of the location(s) pointed-to by the value of the variable x are described by the same type representing the location(s) that may be pointed-to by both values.

The analysis further determines for step 406 whether the ECR $\lambda_2$ for the function type describing the value of the variable y is the same as the ECR $\lambda_3$ for the function type describing the content of the location(s) pointed-to by the value of the variable x. If the ECRs $\lambda_2$ and $\lambda_3$ are not the same, the analysis for step 410 joins the ECRs $\lambda_2$ and $\lambda_3$ on the condition that the run-time values described by the type represented by the ECR $\lambda_3$ comprise a potential function pointer value so that the value of the variable y and the content of the location(s) pointed-to by the value of the variable x are described by the same type representing the function(s) that may be pointed-to by both values.

If the form of the statement is identified as x=fun($f_1 \ldots f_n$)→($r_1 \ldots r_m$) S* for step 404, the analysis processes the store relationship(s) for this statement in accordance with the following representative pseudo-code:

```
x = fun (f₁ ... fₙ)→(r₁ ... rₘ) S*:
    let ref (_ × λ) = type (ecr (x))
        if type (λ) = ⊥ then
            settype (λ, lam (α₁ ... αₙ) (αₙ₊₁ ... αₙ₊ₘ))
            where
                ref (αᵢ) = type (ecr (fᵢ)), for i ≤ n
                ref (αᵢ) = type (ecr (rᵢ₋ₙ)), for i > n
        else
            let lam (α₁ ... αₙ) (αₙ₊₁ ... αₙ₊ₘ) = type (λ) in
                for i ∈ [1 ... n] do
                    let τ₁ × λ₁ = αᵢ
                        ref (τ₂ × λ₂) = type (ecr (fᵢ)) in
                            if τ₁ ≠ τ₂ then join (τ₂,τ₁)
                            if λ₁ ≠ λ₂ then join (λ₂,λ₁)
                for i ∈ [1 ... m] do
                    let τ₁ × λ₁ = αₙ₊ᵢ
                        ref (τ₂ × λ₂) = type (ecr (rᵢ)) in
                            if τ₁ ≠ τ₂ then join (τ₁,τ₂)
                            if λ₁ ≠ λ₂ then join (λ₁,λ₂)
```

That is, the analysis determines for step 406 whether the type constructor associated with the ECR $\lambda$ for the function type describing the value of the variable x is $\bot$ indicating the run-time values described by the type represented by the ECR $\lambda$ do not comprise a potential pointer value, and, if so, the analysis for step 410 modifies the type constructor associated with the ECR $\lambda$ to a function type constructor comprising the types $\alpha_i$ describing the values of the variables $f_1 \ldots f_n$ and $r_1 \ldots r_m$.

If the run-time values described by the type represented by the ECR $\lambda$ comprise a potential pointer value, the analysis determines for step 406 whether the ECR $\tau_1$ for the location type component of each of the types $\alpha_1 \ldots \alpha_{n+m}$ describing the value of the formal and return parameter variables for the function(s) represented by the ECR $\lambda$ is the same as the ECR $\tau_2$ for the location type component describing the value of each of the variables $f_1 \ldots f_n$ and $r_1 \ldots r_m$, respectively. If the respective ECRs $\tau_1$ and $\tau_2$ are not the same, the analysis for step 410 joins the ECRs $\tau_1$ and $\tau_2$. The analysis also determines for step 406 whether the ECR $\lambda_1$ for the function type component of each of the types $\alpha_1 \ldots \alpha_{n+m}$ describing the value of the formal and return parameter variables for the function(s) represented by the ECR $\lambda$ is the same as the ECR $\lambda_2$ for the function type component describing the value of each of the variables $f_1 \ldots f_n$ and $r_1 \ldots r_m$, respectively. If the respective ECRs $\lambda_1$ and $\lambda_2$ are not the same, the analysis for step 410 joins the ECRs $\lambda_1$ and $\lambda_2$.

If the form of the statement is identified as $x_1 \ldots x_m = p(y_1 \ldots y_n)$ for step 404, the analysis processes the store relationship(s) for this statement in accordance with the following representative pseudo-code:

```
x₁ ... xₘ = p (y₁ ... yₙ):
    let ref (_ × λ) = type (ecr (p)) in
        if type (λ) = ⊥ then
            settype (λ, lam (α₁ ... αₙ) (αₙ₊₁ ... αₙ₊ₘ))
                where
                    αᵢ = τᵢ × λ,
                    [τᵢ,λᵢ] = MakeECR (2)
        let lam (α₁ ... αₙ) (αₙ₊₁ ... αₙ₊ₘ) = type (λ) in
            for i ∈ [1 ... n] do
                let τ₁ × λ₁ = αᵢ
                    ref (τ₂ × λ₂) = type (ecr (yᵢ)) in
                    if τ₁ ≠ τ₂ then cjoin (τ₁,τ₂)
                    if λ₁ ≠ λ₂ then cjoin (λ₁,λ₂)
            for i ∈ [1 ... m] do
                let τ₁ × λ₁ = αₙ₊ᵢ
                    ref (τ₂ × λ₂) = type (ecr (xᵢ)) in
                    if τ₁ ≠ τ₂ then cjoin (τ₂,τ₁)
                    if λ₁ ≠ λ₂ then cjoin (λ₂,λ₁)
```

That is, the analysis determines whether the type constructor associated with the ECR $\lambda$ for the function type describing the value of the variable p is $\bot$ indicating the run-time values described by the type represented by the ECR $\lambda$ do not comprise a potential pointer value, and, if so, the analysis modifies the type constructor associated with the ECR $\lambda$ to a function type constructor comprising newly created types $\alpha_i$ describing the values of the formal and return parameter variables for the function(s) represented by the ECR $\lambda$.

The analysis determines for step 406 whether the ECR $\tau_1$ for the location type describing the value of each formal parameter variable for the function(s) represented by the ECR $\lambda$ is the same as the ECR $\tau_2$ for the location type describing the value of each one of the variables $y_1 \ldots y_n$, respectively. If the respective ECRs $\tau_1$ and $\tau_2$ are not the same, the analysis for step 410 joins the ECRs $\tau_1$ and $\tau_2$ on the condition that the run-time values described by the type represented by the ECR $\tau_2$ comprise a potential location pointer value so that the values of the respective variables are described by the same type representing the location(s) that may be pointed-to by both values.

The analysis also determines for step 406 whether the ECR $\lambda_1$ for the function type describing the value of each formal parameter variable for the function(s) represented by the ECR $\lambda$ is the same as the ECR $\lambda_2$ for the function type describing the value of each one of the variables $y_1 \ldots y_n$, respectively. If the respective ECRs $\lambda_1$ and $\lambda_2$ are not the same, the analysis for step 410 joins the ECRs $\lambda_1$ and $\lambda_2$ on the condition that the run-time values described by the type represented by the ECR $\lambda_2$ comprise a potential function pointer value so that the values of the respective variables are described by the same type representing the function(s) that may be pointed-to by both values.

The analysis further determines for step 406 whether the ECR $\tau_1$ for the location type describing the value of each return parameter variable for the function(s) represented by the ECR $\lambda$ is the same as the ECR $\tau_2$ for the location type describing the value of each one of the variables $x_1 \ldots x_m$, respectively. If the respective ECRs $\tau_1$ and $\tau_2$ are not the same, the analysis for step 410 joins the ECRs $\tau_1$ and $\tau_2$ on the condition that the run-time values described by the type represented by the ECR $\tau_1$ comprise a potential location pointer value so that the values of the respective variables are described by the same type representing the location(s) that may be pointed-to by both values.

The analysis also determines for step 406 whether the ECR $\lambda_1$ for the function type describing the value of each return parameter variable for the function(s) represented by the ECR $\lambda$ is the same as the ECR $\lambda_2$ for the function type describing the value of each one of the variables $x_1 \ldots x_m$, respectively. If the respective ECRs $\lambda_1$ and $\lambda_2$ are not the same, the analysis for step 410 joins the ECRs $\lambda_1$ and $\lambda_2$ on the condition that the run-time values described by the type represented by the ECR $\lambda_2$ comprise a potential function pointer value so that the values of the respective variables are described by the same type representing the function(s) that may be pointed-to by both values.

Analysis of Sample Program

FIGS. 5A, 5B, 5C, and 5D illustrate graphical representations for types describing locations and functions as the locations and functions are typed for one embodiment of the flow diagram of FIG. 4 for the following sample program:

y=x
y=z
x=5
z=&x
id=fun(i)→(o)
   o=i
y=id(id)

Figure 5A:
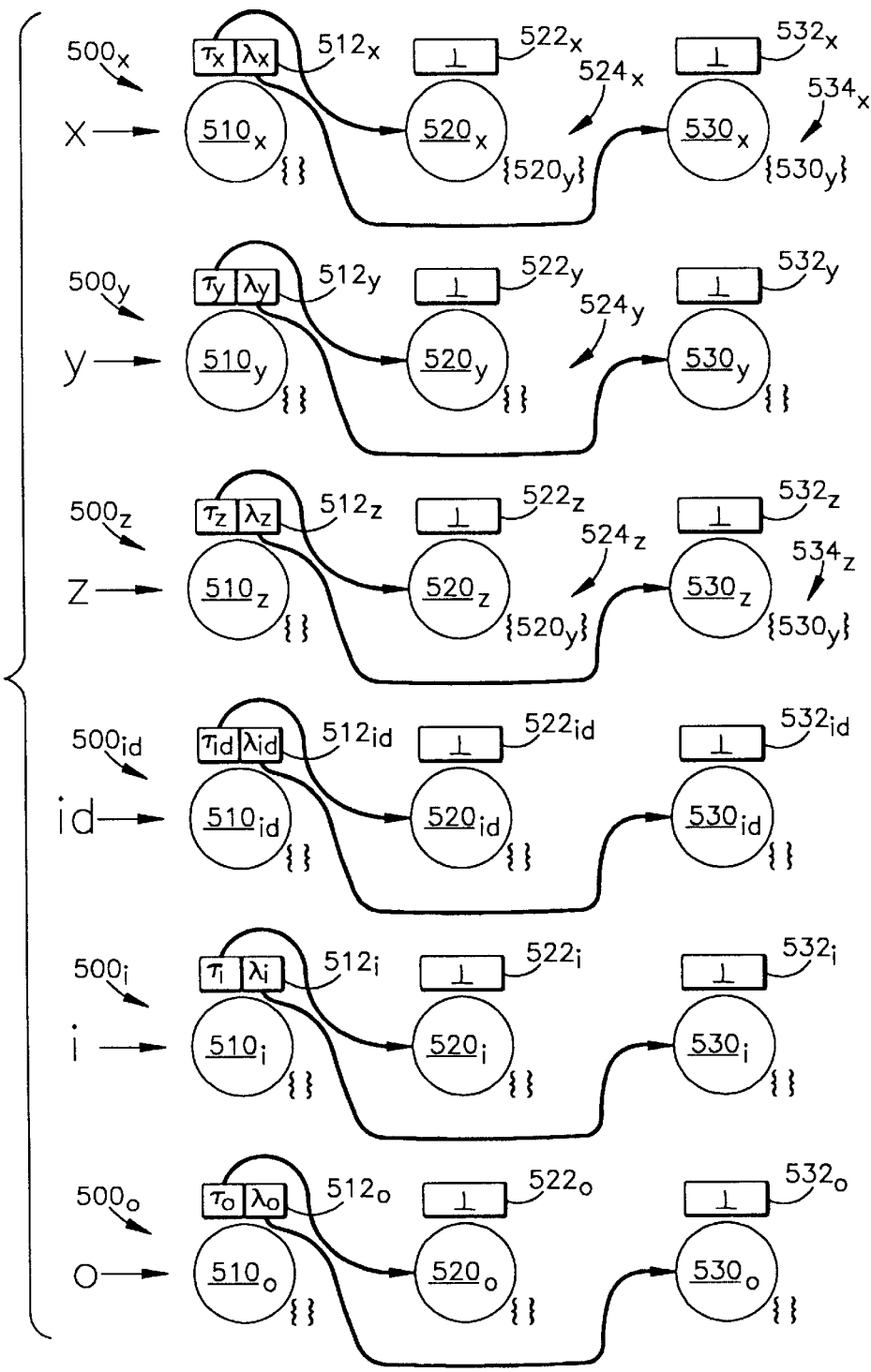
FIGS. 5A, 5B, 5C, and 5D illustrate for one embodiment graphical representations of types for a sample program as the program is analyzed in accordance with the flow diagram of FIG. 4.

As illustrated in FIG. 5A, the analysis for step 402 describes each variable x, y, z, id, i, and o with a separate type $500_x$, $500_y$, $500_z$, $500_{id}$, $500_i$, and $500_o$, respectively. Each type 500 is represented by a respective type variable $510_x$, $510_y$, $510_z$, $510_{id}$, $510_i$, and $510_o$ with an associated type constructor $512_x$, $512_y$, $512_z$, $512_{id}$, $512_i$, and $512_o$.

Each type constructor 512 comprises a respective location type component $\tau_x$, $\tau_y$, $\tau_z$, $\tau_{id}$, $\tau_i$, and $\tau_o$ and a respective function type component $\lambda_x$, $\lambda_y$, $\lambda_z$, $\lambda_{id}$, $\lambda_i$, and $\lambda_o$ describing the content of the location represented by the respective type variable 510. Each location type component $\tau$ is represented by a respective type variable $520_x$, $520_y$, $520_z$, $520_{id}$, $520_i$, and $520_o$ with an associated type constructor $522_x$, $522_y$, $522_z$, $522_{id}$, $522_i$, and $522_o$, and each function type component $\lambda$ is represented by a respective type variable $530_x$, $530_y$, $530_z$, $530_{id}$, $530_i$, and $530_o$, with an associated type constructor $532_x$, $532_y$, $532_z$, $532_{id}$, $532_i$, and $532_o$. Each type constructor 522 and 532 comprises a $\bot$ designation indicating the content of the location represented by each respective type variable 510 does not comprise a potential pointer value.

For step 404, the analysis identifies the form of the statement y=x. In accordance with the type rule for this statement form, the analysis for step 406 determines the location type $\tau_y$ describing the value of the variable y is not the same as the location type $\tau_x$ describing the value of the variable x and determines the function type $\lambda_y$ describing the value of the variable y is not the same as the function type $\lambda_x$ describing the value of the variable x. The analysis also determines for step 406 the content of the location represented by type constructor $512_x$ does not comprise a potential location pointer value as indicated by the $\bot$ designation for type constructor $522_x$ and does not comprise a potential function pointer value as indicated by the $\bot$ designation for the type constructor $532_x$. The analysis therefore determines this statement is well-typed for the current typing environment.

The analysis for step 408 identifies a potential points-to relationship for the run-time values described by the location type $\tau_y$ in case the analysis subsequently determines the run-time values described by the location type $\tau_x$ comprise a potential location pointer value. The analysis identifies this potential points-to relationship by identifying type variable $520_y$ in a pending set $524_x$ for type variable $520_x$, as illustrated in FIG. 5A.

The analysis for step 408 also identifies a potential points-to relationship for the run-time values described by the function type $\lambda_y$ in case the analysis subsequently determines the run-time values described by the function type $\lambda_x$ comprise a potential function pointer value. The analysis identifies this potential points-to relationship by identifying type variable $530_y$ in a pending set $534_x$ for type variable $530_x$, as illustrated in FIG. 5A.

The analysis identifies the form of another statement y=z for step 404. Like the previously processed statement y=x, the analysis determines for step 406 this statement is well-typed for the current typing environment and identifies for step 408 a potential points-to relationship for the content of the location described by type constructor $512_y$ in case the analysis subsequently determines the content of the location described by type constructor $512_z$ comprises a potential location or function pointer value. The analysis identifies this potential points-to relationship by identifying type variable $520_y$ in a pending set $524_z$ for type variable $520_z$ and by identifying type variable $530_y$ in a pending set $534_z$ for type variable $530_z$, as illustrated in FIG. 5A.

The analysis identifies the form of another statement x=5 for step 404. In accordance with the type rule for this statement form, the analysis determines for step 406 this statement is well-typed as the primitive operator 5 does not have any operands. The analysis for step 408 does not identify any potential points-to relationships for this statement.

The analysis identifies the form of another statement z=&x for step 404. In accordance with the type rule for this statement form, the analysis determines the location type $\tau_z$ describing the value of the variable z is not the same as the location type $500_x$ representing the location representing the variable x and therefore determines the statement is not well-typed for step 406. The analysis for step 410 joins type variables $520_z$ and $510_x$ so the statement is well-typed.

Figure 5B:
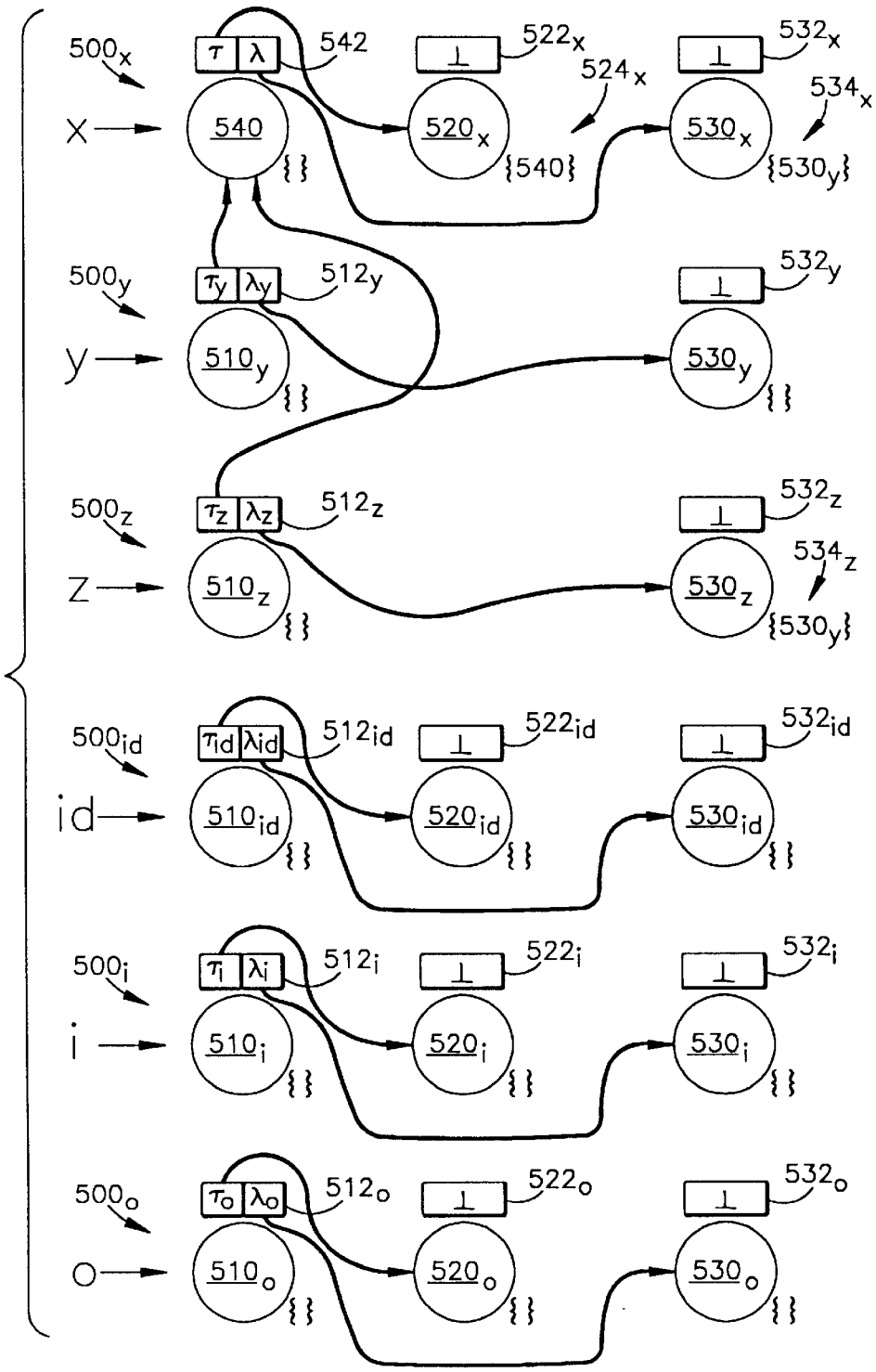

Because the analysis for step 412 determines the run-time values described by the location type $\tau_z$ now comprise a location pointer value, the analysis determines the potential points-to relationship for type variable $520_y$ identified in pending set $524_z$ for type variable $520_z$ is affected. The analysis for step 414 therefore joins type variable $520_y$ with the already joined type variables $520_z$ and $510_x$ to form a type variable 540 with a type constructor 542 that is the same as type constructor $512_x$, as illustrated in FIG. 5B. Although the analysis determines for step 412 that the run-time values described by the location type $\tau_y$ now comprise a location pointer value, the analysis determines no store relationships are affected as a pending set $524_y$ for type variable $520_y$ is empty.

Figure 5C:
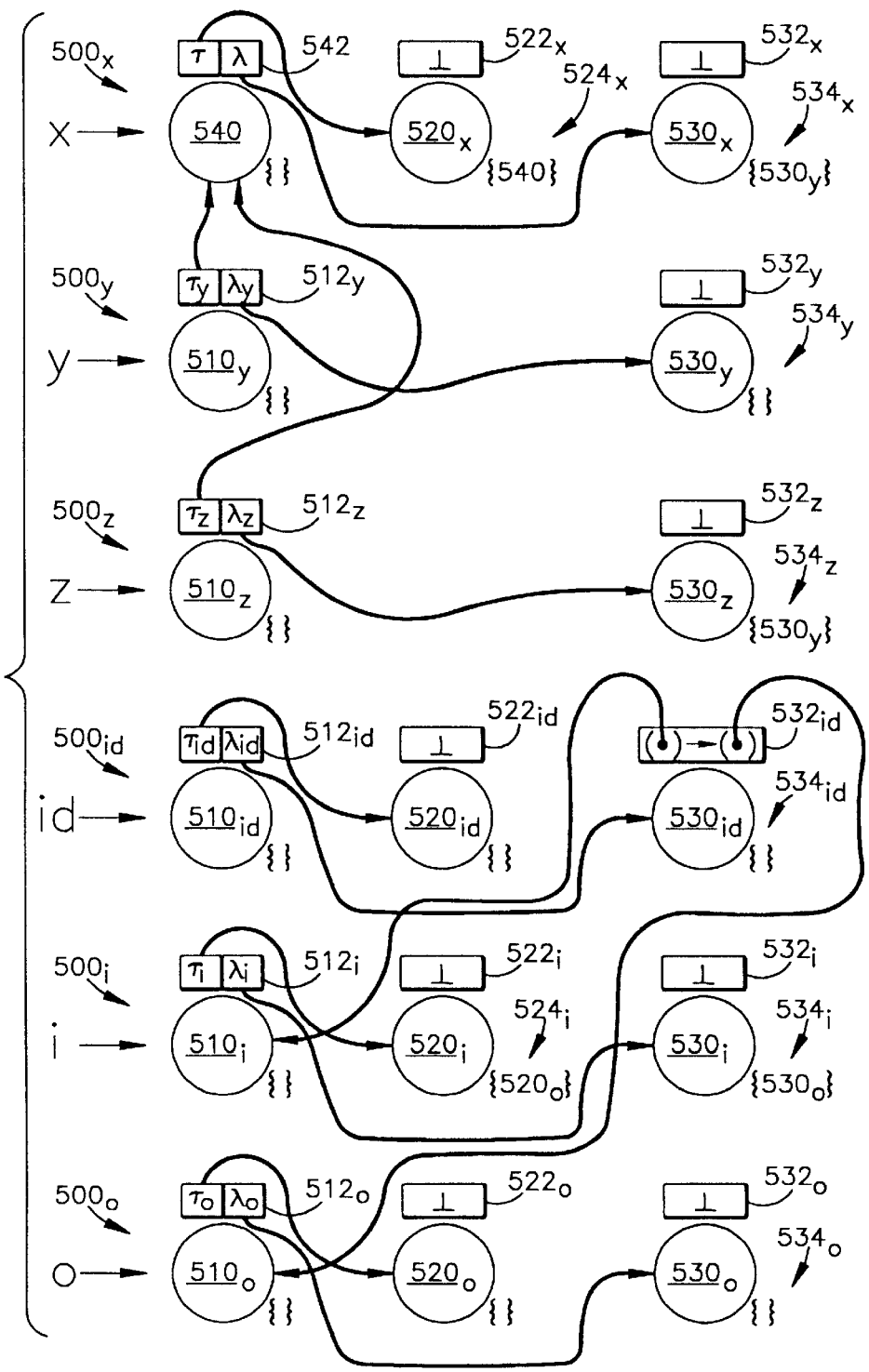

The analysis identifies the form of another statement id=fun(i)→(o) o=i for step 404. In accordance with the type rule for this statement form, the analysis determines for step 406 the run-time values described by the function type $\lambda_{id}$ do not comprise a potential function pointer value as indicated by the ⊥ designation for type constructor $532_{id}$ and therefore determines the statement is not well-typed. The analysis for step 410 modifies type constructor $532_{id}$ to a function type constructor comprising the type $500_i$ describing the variable i and the type $500_o$ describing the variable o, as illustrated in FIG. 5C, so the store relationships described by id=fun (i)→(o) are well-typed. Although the analysis determines for step 412 that the run-time values described by the function type $\lambda_{id}$ now comprise a function pointer value, the analysis determines no store relationships are affected as a pending set $534_{id}$ for type variable $530_{id}$ is empty.

Like the previously processed statement y=x, the analysis also determines for step 406 the store relationship o=i is well-typed so the statement is well-typed. The analysis identifies for step 408 a potential points-to relationship for the content of the location described by type constructor $512_o$ in case the analysis subsequently determines the content of the location described by type constructor $512_i$ comprises a potential location or function pointer value. The analysis identifies this potential points-to relationship by identifying type variable $520_o$ in a pending set $524_i$ for type variable $520_i$ and by identifying type variable $530_o$ in a pending set $534_i$ for type variable $530_i$, as illustrated in FIG. 5C.

The analysis identifies the form of another statement y=id(id) for step 404. In accordance with the type rule for this statement form, the analysis for step 406 determines the location type $\tau_i$ describing the value of the formal parameter variable for the function(s) pointed-to by the variable id is not the same as the location type $\tau_{id}$ describing the value of the variable id and determines the content of the location described by type constructor $512_{id}$ does not comprise a potential location pointer value as indicated by the ⊥ designation for type constructor $522_{id}$. The analysis for step 408 identifies a potential points-to relationship for the location type $\tau_i$ in case the analysis subsequently determines the run-time values described by the location type $\tau_{id}$ comprise a potential location pointer value. The analysis identifies this potential points-to relationship by identifying type variable $520_i$ in a pending set $524_{id}$ for type variable $520_{id}$.

The analysis also determines for step 406 the function type $\lambda_i$ describing the value of the formal parameter variable for the function(s) pointed-to by the variable id is not the same as the function type $\lambda_{id}$ describing the value of the variable id and determines the content of the location described by type constructor $512_{id}$ comprises a potential function pointer value as indicated by type constructor $532_{id}$. The analysis therefore joins type variables $530_i$ and $530_{id}$ for step 410.

Because the analysis for step 412 determines the run-time values described by the function type $\lambda_i$ now comprise a function pointer value, the analysis determines the potential points-to relationship for type variable $530_o$ identified in pending set $534_i$ for type variable $530_i$ is affected. The analysis therefore joins type variable $530_o$ with the already joined type variables $530_i$ and $530_{id}$ for step 414. Although the analysis determines for step 412 that the run-time values described by the function type $\lambda_o$ now comprise a function pointer value, the analysis determines no store relationships are affected as a pending set $534_o$ for type variable $530_o$ is empty.

The analysis for step 406 further determines the location type $\tau_o$ describing the value of the return parameter variable for the function(s) pointed-to by the variable id is not the same as the location type $\tau_y$ describing the value of the variable y and determines the content of the location described by type constructor $512_o$ does not comprise a potential location pointer value as indicated by the ⊥ designation for type constructor $522_o$. The analysis for step 408 identifies a potential points-to relationship for the location type $\tau_y$ in case the analysis subsequently determines the run-time values described by the location type $\tau_o$ comprise a potential location pointer value. The analysis identifies this potential points-to relationship by identifying type variable $540$ in a pending set $524_o$ for type variable $520_o$.

Figure 5D:
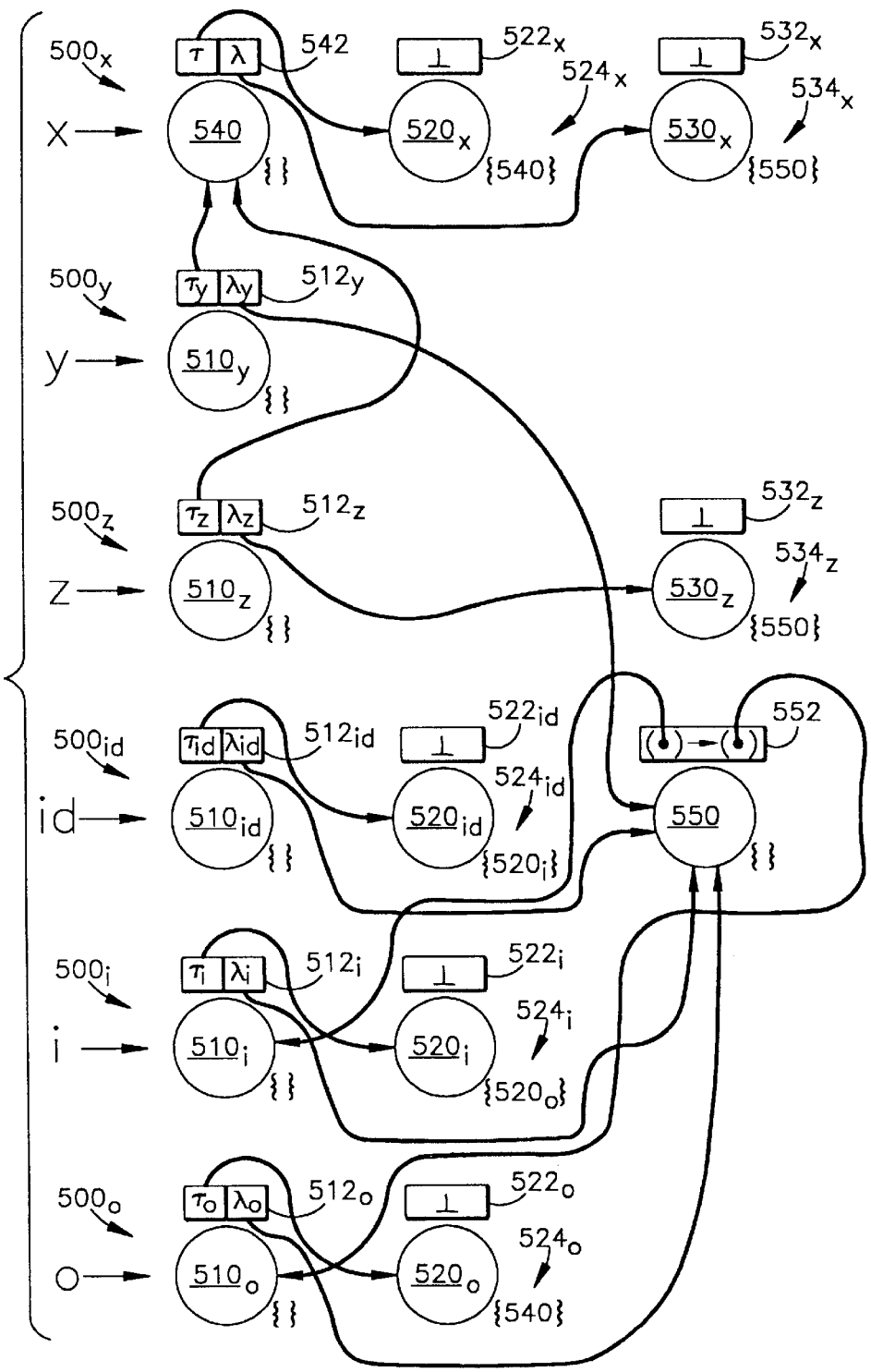

The analysis for step $406$ also determines the function type $\lambda_o$ describing the value of the return parameter variable for the function(s) pointed-to by the variable id is not the same as the function type $\lambda_y$ describing the value of the variable y and determines the content of the location described by type constructor $512_o$ comprises a potential function pointer value as type variable $530_o$ has been joined with type variable $530_{id}$. The analysis therefore joins type variable $530_y$ with the already joined type variables $530_i$, $530_{id}$, and $530_o$ for step $410$ to form a type variable $550$ with a type constructor $552$ that is the same as type constructor $532_{id}$, as illustrated in FIG. 5D. Although the analysis determines for step $412$ that the run-time values described by the function type $\lambda_y$ now comprise a function pointer value, the analysis determines no store relationships are affected as a pending set $534_y$ for type variable $530_y$ is empty.

Because each statement of the sample program is now well-typed, the sample program is well-typed. The set of types illustrated in FIG. 5D define the store model for the sample program and is a valid description of all possible run-time storage configurations for the program.

Data Processing System

Figure 6:
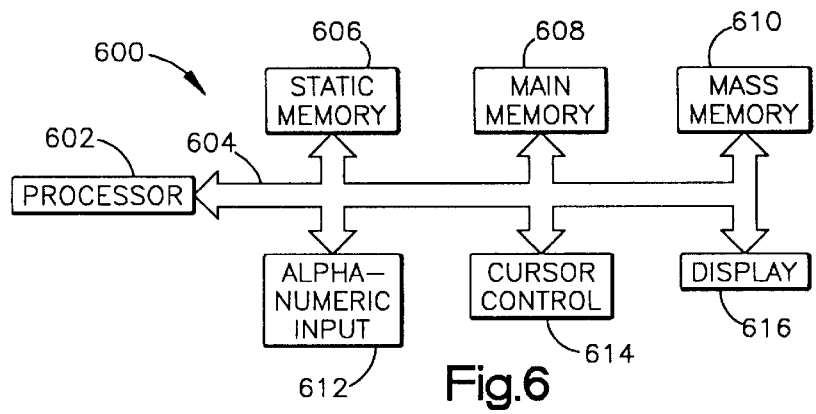
FIG. 6 illustrates for one embodiment a data processing system for performing a pointer analysis by type inference combined with a non-pointer analysis for a program.

For one embodiment, pointer analysis by type inference combined with non-pointer analysis for a program may be implemented in software for execution by any suitable data processing system configured with any suitable combination of hardware devices. FIG. 6 illustrates for one embodiment a data processing system $600$ that may be programmed to perform pointer analysis by type inference combined with non-pointer analysis for a program.

As illustrated in FIG. 6, data processing system $600$ comprises a processor $602$, a system bus $604$, a static memory $606$, a main memory $608$, a mass memory $610$, an alphanumeric input device $612$, a cursor control device $614$, and a display $616$. System bus $604$ couples processor $602$, static memory $606$, main memory $608$, mass memory $610$, alphanumeric input device $612$, cursor control device $614$, and display $616$.

Processor $602$ comprises a suitable processing device such as a microprocessor, for example, and may comprise a plurality of suitable processing devices. Processor $602$ may execute instructions stored in static memory $606$, main memory $608$, and/or mass memory $610$ for example. Processor $602$ may process data stored in static memory $606$, main memory $608$, and/or mass memory $610$ for example.

Static memory $606$ may comprise read only memory (ROM) or any other suitable memory device. Static memory $606$ may store, for example, a boot program for execution by processor $602$ to initialize data processing system $600$. Main memory $608$ may comprise random access memory (RAM) or any other suitable memory device. Mass memory $610$ may comprise a hard disk device, a floppy disk, an optical disk, a flash memory device, a file server device, or any other suitable memory device. For this detailed description, the term memory comprises a single memory device and any combination of suitable memory devices for the storage of data and instructions, for example.

System bus $604$ provides for the communication of digital information between hardware devices for data processing system $600$. Processor $602$ may receive over system bus $604$ information that is input by a user through alphanumeric input device $612$ and/or cursor control device $614$. Alphanumeric input device $612$ may comprise a keyboard, for example, that comprises alphanumeric keys. Alphanumeric input device $612$ may comprise other suitable keys, comprising function keys for example. Alphanumeric input device $612$ may be used to input information or commands, for example, for data processing system $600$. Cursor control device $614$ may comprise a mouse, touch tablet, track-ball, and/or joystick, for example, for controlling the movement of a cursor displayed by display $616$.

Processor $602$ may also output over system bus $604$ information that is to be displayed on display $616$. Display $616$ may comprise a cathode ray tube (CRT) or a liquid crystal display (LCD), for example, for displaying information to a user. Processor $602$ may use system bus $604$ to transmit information to and to receive information from other hardware devices such as mass memory $610$ for example.

Data processing system $600$ may be programmed to execute suitable program code or machine instructions directing data processing system $600$ to perform pointer analysis by type inference combined with non-pointer analysis for a program. For one embodiment, the executable program code or machine instructions for the analysis may be stored in main memory $608$ and/or in mass memory $610$, such as on a suitable magnetic or optical disk for example, for execution by processor $602$. The program analyzed by data processing system $600$ may also be stored in main memory $608$ and/or in mass memory $610$, such as on a suitable magnetic or optical disk for example.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A method for performing a pointer analysis for a program with a data processing system, the method comprising the steps of:

a) identifying a store relationship between locations for the program;

b) determining whether types representing the locations for the identified store relationship comply with a typing constraint;

c) identifying from the identified store relationship any potential points-to relationships for a type representing a non-pointer value;

d) if the types representing the locations for the identified store relationship do not comply with the typing constraint, modifying types representing locations for the identified store relationship to comply with the typing constraint; and e) modifying types representing locations for any identified potential points-to relationships affected by the modifying step (d).

2. The method of claim 1, wherein the identifying step (a) comprises the step of identifying a form of a program statement describing the store relationship.

3. The method of claim 2, wherein the determining step (b) comprises the step of determining whether the types representing the locations for the identified store relationship comply with a type rule specifying the typing constraint for the identified program statement form.

4. The method of claim 1, wherein the identifying step (c) identifies a potential points-to relationship in a pending set.

5. The method of claim 1, comprising the step of modifying types representing locations for any identified potential points-to relationships affected by the modifying step (e).

6. The method of claim 1, wherein the modifying step (d) comprises the step of unifying types representing locations for the identified store relationship.

7. The method of claim 6, wherein each type is represented by a type variable and an associated type constructor; and wherein the step of unifying types comprises the steps of joining type variables and unifying associated type constructors for types representing locations for the identified store relationship.

8. The method of claim 1, wherein one of the types comprises a location type and a function type, each describing a content of a location represented by the one type.

9. The method of claim 1, wherein each type is represented by a type variable and an associated type constructor.

10. The method of claim 9, wherein the type variable is an equivalence class representative.

11. The method of claim 10, wherein the equivalence class representative is implemented as a fast-union/find data structure.

12. The method of claim 1, wherein the program describes a plurality of store relationships and wherein the method analyzes each described store relationship only one time in an order independent of program control flow.

13. The method of claim 1, wherein the method performs the pointer analysis while compiling the program for execution by a data processing system.

14. The method of claim 1, wherein the method performs the pointer analysis for a program browser.

15. A method for performing a pointer analysis for a program with a data processing system, the method comprising the steps of:
    a) identifying a store relationship between locations for the program;
    b) determining whether types representing locations for the identified store relationship are the same;
    c) unifying the types representing locations for the identified store relationship if the types representing locations for the identified store relationship are different and if a select one of the types representing locations for the identified store relationship describes a potential pointer value;
    d) identifying from the identified store relationship a potential points-to relationship for the select type if the select type describes a non-pointer value; and
    e) unifying types representing locations for any identified potential points-to relationships affected by the unifying step (c).

16. The method of claim 15, wherein the identifying step (a) comprises the step of identifying a form of a program statement describing the store relationship.

17. The method of claim 15, wherein the identifying step (d) identifies the potential points-to relationship in a pending set.

18. The method of claim 15, wherein each type is represented by a type variable and an associated type constructor; and wherein the unifying step (c) comprises the steps of joining type variables and unifying associated type constructors for types representing locations for the identified store relationship.

19. The method of claim 15, wherein one of the types comprises a location type and a function type, each describing a content of a location represented by the one type.

20. The method of claim 15, wherein each type is represented by a type variable and an associated type constructor.

21. The method of claim 20, wherein the type variable is an equivalence class representative.

22. The method of claim 21, wherein the equivalence class representative is implemented as a fast-union/find data structure.

23. The method of claim 15, wherein the program describes a plurality of store relationships and wherein the method analyzes each described store relationship only one time in an order independent of program control flow.

24. The method of claim 15, wherein the method performs the pointer analysis while compiling the program for execution by a data processing system.

25. The method of claim 15, wherein the method performs the pointer analysis for a program browser.

26. A memory for storing software for execution by a data processing system to perform a pointer analysis for a program, the memory comprising:
    a) program code stored by the memory for identifying a store relationship between locations for the program;
    b) program code stored by the memory for determining whether types representing the locations for the identified store relationship comply with a typing constraint;
    c) program code stored by the memory for identifying from the identified store relationship any potential points-to relationships for a type representing a non-pointer value;
    d) program code stored by the memory for modifying types representing locations for the identified store relationship to comply with the typing constraint if the types representing the locations for the identified store relationship do not comply with the typing constraint; and
    e) program code stored by the memory for modifying types representing locations for any identified potential points-to relationships affected by the modification of types representing locations for the identified store relationship.

27. The memory of claim 26, wherein the program code (a) comprises program code for identifying a form of a program statement describing the store relationship.

28. The memory of claim 27, wherein the program code (b) comprises program code for determining whether the types representing the locations for the identified store relationship comply with a type rule specifying the typing constraint for the identified program statement form.

29. The memory of claim 26, wherein the program code (c) comprises program code for identifying a potential points-to relationship in a pending set.

30. The memory of claim 26, comprising program code stored by the memory for modifying types representing locations for any identified potential points-to relationships affected by the modification of types representing locations for an affected potential points-to relationship.

31. The memory of claim 26, wherein the program code (d) comprises program code for unifying types representing locations for the identified store relationship.

32. The memory of claim 31, comprising program code stored by the memory for representing each type by a type variable and an associated type constructor; and wherein the program code for unifying types comprises program code for joining type variables and for unifying associated type constructors for types representing locations for the identified store relationship.

33. The memory of claim 26, comprising program code stored by the memory for describing a content of a location represented by one of the types with a location type and a function type.

34. The memory of claim 26, comprising program code stored by the memory for representing each type by a type variable and an associated type constructor.

35. The memory of claim 34, wherein the type variable is an equivalence class representative.

36. The memory of claim 35, wherein the equivalence class representative is implemented as a fast-union/find data structure.

37. The memory of claim 26, wherein the program describes a plurality of store relationships and wherein the data processing system, when executing the software, analyzes each described store relationship only one time in an order independent of program control flow.

38. The memory of claim 26, comprising program code stored by the memory for compiling the program for execution by a data processing system.

39. The memory of claim 26, comprising program code stored by the memory for a program browser.

40. A memory for storing software for execution by a data processing system to perform a pointer analysis for a program, the memory comprising:
  a) program code stored by the memory for identifying a store relationship between locations for the program;
  b) program code stored by the memory for determining whether types representing locations for the identified store relationship are the same;
  c) program code stored by the memory for unifying the types representing locations for the identified store relationship if the types representing locations for the identified store relationship are different and if a select one of the types representing locations for the identified store relationship describes a potential pointer value;
  d) program code stored by the memory for identifying from the identified store relationship a potential points-to relationship for the select type if the select type describes a non-pointer value; and
  e) program code stored by the memory for unifying types representing locations for any identified potential points-to relationships affected by the unification of types representing locations for the identified store relationship.

41. The memory of claim 40, wherein the program code (a) comprises program code for identifying a form of a program statement describing the store relationship.

42. The memory of claim 40, wherein the program code (d) comprises program code for identifying the potential points-to relationship in a pending set.

43. The memory of claim 40, comprising program code stored by the memory for representing each type by a type variable and an associated type constructor; and
  wherein the program code (c) comprises program code for joining type variables and for unifying associated type constructors for types representing locations for the identified store relationship.

44. The memory of claim 40, comprising program code stored by the memory for describing a content of a location represented by one of the types with a location type and a function type.

45. The memory of claim 40, comprising program code stored by the memory for representing each type by a type variable and an associated type constructor.

46. The memory of claim 45, wherein the type variable is an equivalence class representative.

47. The memory of claim 46, wherein the equivalence class representative is implemented as a fast-union/find data structure.

48. The memory of claim 40, wherein the program describes a plurality of store relationships and wherein the data processing system, when executing the software, analyzes each described store relationship only one time in an order independent of program control flow.

49. The memory of claim 40, comprising program code stored by the memory for compiling the program for execution by a data processing system.

50. The memory of claim 40, comprising program code stored by the memory for a program browser.

51. A data processing system comprising:
  a) a translator for translating a program in a first language into code in a second language;
  b) a pointer analyzer for performing a pointer analysis for the program, the pointer analyzer for identifying potential points-to relationships for types representing non-pointer values, for modifying types representing locations for points-to relationships between locations to comply with typing constraints, and for modifying types representing locations for any identified potential points-to relationships affected by the modification of types for points-to relationships;
  c) a store model for storing the types representing locations for the program; and
  d) an optimizer for optimizing the code based on the store model.

52. The data processing system of claim 51, comprising a symbol table for identifying locations for the program.

53. The data processing system of claim 51, wherein the pointer analyzer identifies a potential points-to relationship in a pending set.

54. The data processing system of claim 51, wherein the pointer analyzer modifies types representing locations by unification.

55. The data processing system of claim 51, wherein each type is represented by a type variable and an associated type constructor.

56. The data processing system of claim 51, wherein the pointer analyzer analyzes the program in an order independent of program control flow.

* * * * *